United States Patent
Holt et al.

(10) Patent No.: US 11,272,593 B2
(45) Date of Patent: Mar. 8, 2022

(54) SYSTEM AND METHODS FOR PROVIDING A UNIFORM AND TUNABLE HYPER-SPECTRAL SOURCE

(71) Applicant: Labsphere, Inc., North Sutton, NH (US)

(72) Inventors: Jeffrey William Holt, Concord, NH (US); Erik Skarin, Sunapee, NH (US); Mark Duquette, Andover, NH (US); Jonathan D Scheuch, New London, NH (US); Michael Dann, Enfield, NH (US)

( * ) Notice: Subject to any disclaimer, the term of this patent is extended or adjusted under 35 U.S.C. 154(b) by 113 days.

(21) Appl. No.: 16/929,256

(22) Filed: Jul. 15, 2020

(65) Prior Publication Data
US 2022/0022295 A1 Jan. 20, 2022

(51) Int. Cl.
*G01J 3/28* (2006.01)
*H05B 45/22* (2020.01)
*G01J 3/02* (2006.01)

(52) U.S. Cl.
CPC ............ *H05B 45/22* (2020.01); *G01J 3/0208* (2013.01); *G01J 3/28* (2013.01)

(58) Field of Classification Search
CPC ........ G01J 3/28; G01J 3/14; G01J 3/02; G01J 3/0208; H05B 45/22
See application file for complete search history.

(56) References Cited

U.S. PATENT DOCUMENTS 6,128,078 A 10/2000 Fateley
2013/0003064 A1* 1/2013 Allen .................. G01J 3/10
356/402

* cited by examiner

*Primary Examiner* — Abdullahi Nur
(74) *Attorney, Agent, or Firm* — Dinsmore & Shohl, LLP; Monika L. Jaensson, Esq.

(57) ABSTRACT

An illumination system includes an illumination source configured to emit illumination light and a dispersive optical element configured to generate an angularly dispersed optical signal from the illumination light that is used to generate a spectral image. A digital micro-mirror device (DMD) includes an array of reflective elements that receive the spectral image and direct a portion of the spectral image to an integrating sphere. A controller is configured to calculate a subset of an array of reflective elements of the DMD to activate based on a target illumination output signal using a calibration model of the illumination system. The controller is also configured to activate the subset of the array of reflective elements to change the portion of the spectral image directed to the integrating sphere to generate an illumination output signal that substantially matches the target illumination output signal.

20 Claims, 17 Drawing Sheets

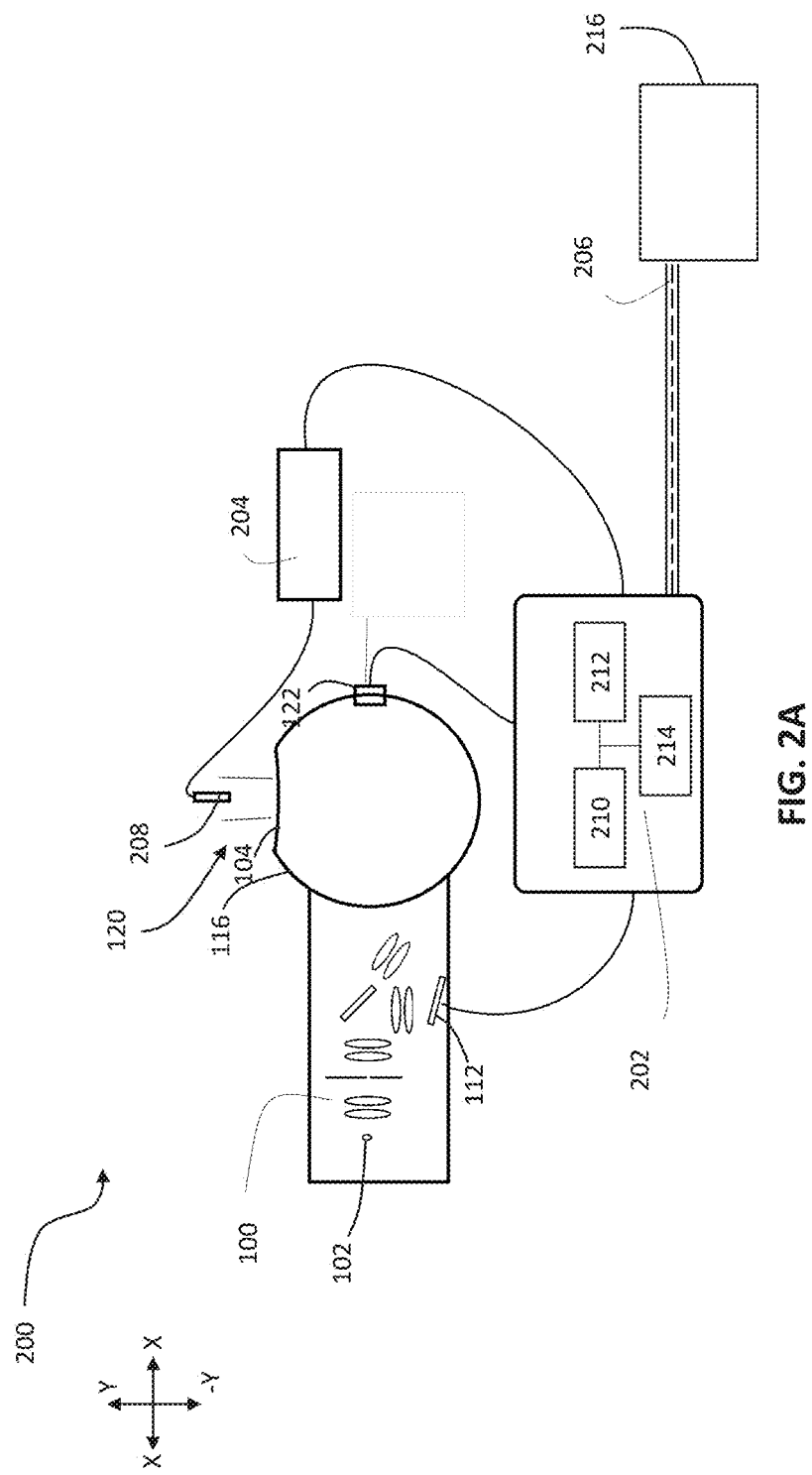

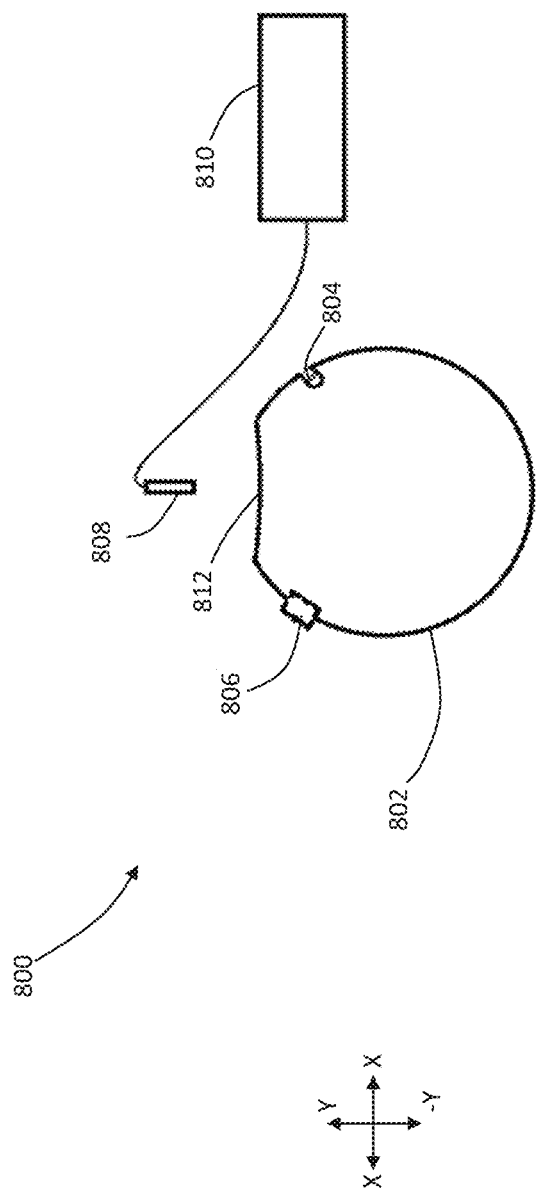

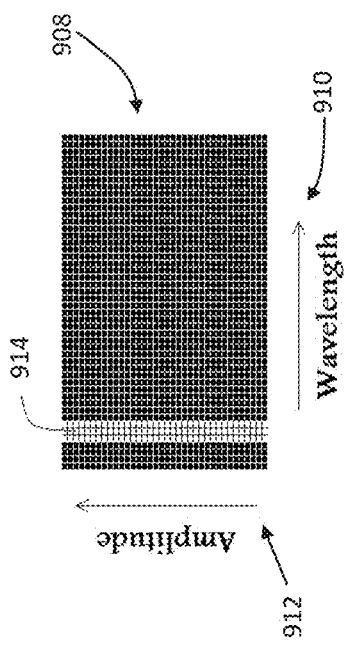
FIG. 9B
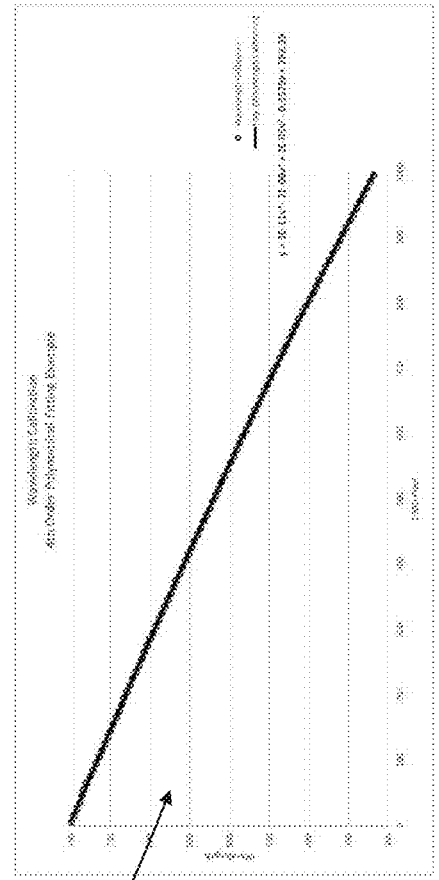
FIG. 9C
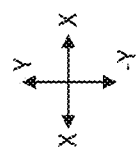

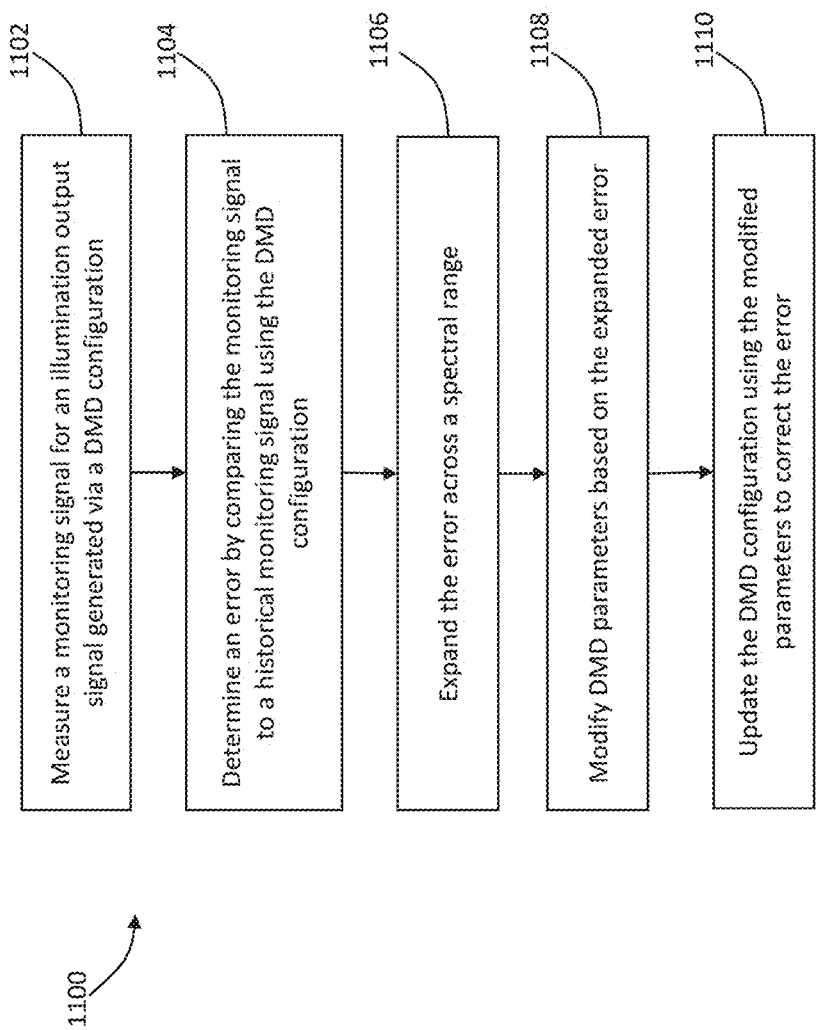

SYSTEM AND METHODS FOR PROVIDING A UNIFORM AND TUNABLE HYPER-SPECTRAL SOURCE

BACKGROUND

Field

The present specification generally relates to an illumination source and, more particularly, to illumination sources generating uniform illumination that can be tuned to generate an arbitrary user-defined spectral power distribution and methods pertaining to the same.

Technical Background

Rapid developments in the fields of imaging devices, sensor technologies, and chemical analysis have created a demand for a highly flexible illumination source for calibration and testing. For example, certain sensors may require a color-sensitive response calibration requiring illumination with many different spectral bands. If such a calibration is not accomplished through the utilization of an adequately flexible illumination source, an inaccurate calibration curve may be produced, leading to phenomena such as metamerism in the sensor. Existing illumination sources may utilize a single adjustable light emitting diode (LED) or a plurality of LEDs mixed together to provide an adjustable illumination output. Such sources lack the flexibility and precision to provide completely accurate calibration for sensors.

Accordingly, a need exists for a flexible illumination source where the spectral components of the illumination can be tuned to generate a wide variety of spectral power distributions suited to a diverse array of applications.

SUMMARY

According to an embodiment of the present disclosure, an illumination system includes an illumination source configured to emit illumination light, a dispersive optical element configured to generate an angularly dispersed optical signal from the illumination light, a focusing optics system configured to generate a spectral image from the angularly dispersed optical signal, and a digital micro-mirror device (DMD) comprising an array of reflective elements. The DMD is configured to receive the spectral image and direct a portion of the spectral image as an illumination optical signal. A collection optics system is configured to direct the illumination optical signal to an entrance port of an integrating sphere. A controller is communicably coupled to the DMD. The controller is configured to: calculate a subset of the array of reflective elements to activate based on a target illumination output signal using a calibration model of the illumination system; and activate the subset of the array of reflective elements to change the portion of the spectral image directed to the entrance port to generate an illumination output signal that substantially matches the target illumination output signal.

According to another embodiment of the present disclosure, a method of generating an illumination output signal using an illumination optical system includes illuminating a dispersive optical element with illumination light from an illumination source to generate an angularly dispersed optical signal from the illumination light. The method also includes generating a spectral image from the angularly dispersed optical signal using a focusing optical system. The method also includes determining a configuration for a digital micro-mirror device (DMD) based on a desired spectral power distribution for an illumination output signal, wherein the configuration for the DMD comprises an activated subset of an array of reflective elements of the DMD. The method also includes directing a portion of the spectral image into an entrance port of an integrating optical sphere using the activated subset of the reflective elements of the DMD to generate the illumination output signal.

According to another embodiment of the present disclosure, a method of generating an illumination output signal of an illumination system includes illuminating a dispersive optical element with illumination light from an illumination source to generate an angularly dispersed optical signal from the illumination light. The method also includes generating a spectral image from the angularly dispersed optical signal using a focusing optical system. The method also includes directing a portion of the spectral image into an entrance port of an integrating sphere using an activated subset of the reflective elements of the DMD to generate an illumination output signal. The method also includes measuring the illumination output signal with a monitoring sensor to generate a measurement signal. The method also includes comparing the measurement signal to a historical measurement signal for the activated subset of reflective elements of the DMD. The method also includes updating the activated subset of the reflective elements of the DMD based on the comparison.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 2A schematically depicts an illumination system including the illumination optical system depicted in FIG. 1, according to one or more embodiments described herein;

FIG. 8 schematically depicts a portion of an illumination optical system including a calibrating light source, according to one or more embodiments described herein;

FIG. 9B schematically depicts a calibration subset of a plurality of reflective elements of a digital micro-mirror device used during the method depicted in FIG. 9A, according to one or more embodiments described herein;

FIG. 9C depicts a calibration curve generated during the method depicted in FIG. 9A using the calibration subset depicted in FIG. 9B, according to one or more embodiments described herein;

FIG. 11 depicts a flow diagram of correcting an error in an illumination output signal of an illumination system by updating a configuration of a digital micro-mirror device, according to one or more embodiments described herein.

DETAILED DESCRIPTION

Figure 1:
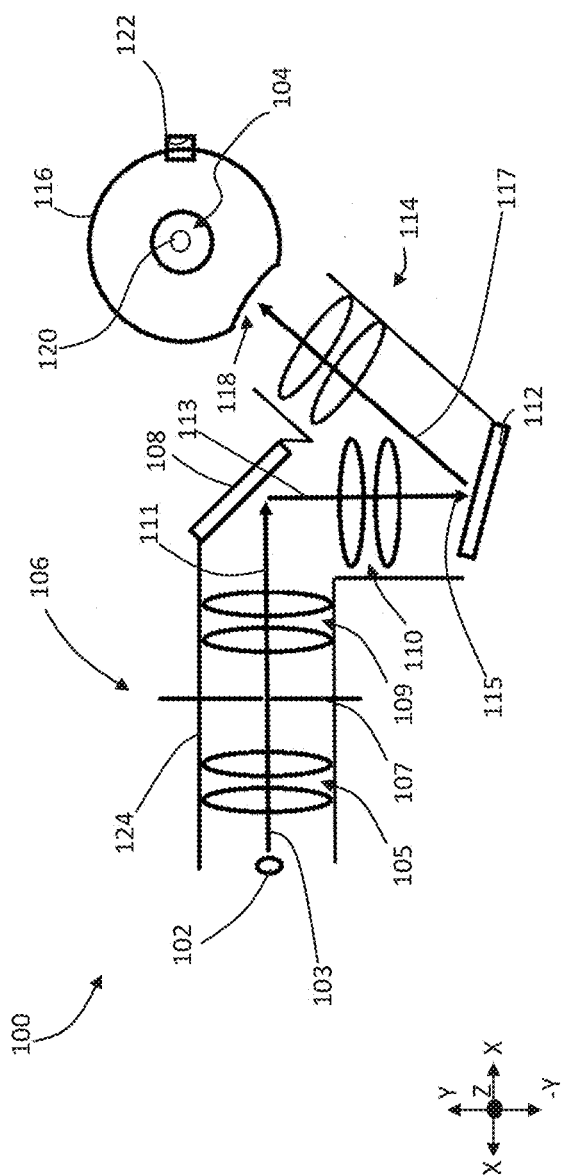
FIG. 1 schematically depicts an illumination optical system, according to one or more embodiments described herein.

Reference will now be made in detail to embodiments of illumination systems and methods for calibrating and using the same. The illumination systems may generate illumination output signals that are both temporally stable and spectrally tunable to an arbitrary spectral power distribution based on a user input. As such, the illumination systems and associated methods described herein have applicability in a wide variety of fields such as sensor calibration, camera calibration, colorimeter calibration, and material/chemical analysis and identification.

In various embodiments, the illumination systems described herein include an illumination source that emits illumination light, a dispersive optical element that angularly disperses the illumination light, and a focusing optics system that focuses the angularly dispersed illumination light onto a digital micro-mirror device (DMD). In embodiments, a control system for the DMD activates different subsets of an array of reflective elements of the DMD such that a portion of the illumination light is provided into an integrating sphere, which produces an uniform illumination output signal having a spectral power distribution specifically tuned to an input of the user. Various embodiments include a multi-component illumination source to enhance the customizability of the illumination output signal. For example, certain embodiments may include an additional DMD that feeds a different portion of the illumination light to the integrating sphere. The multiple DMDs in these embodiments may receive illumination light from different illumination sources or receive different spectral portions of illumination light from the same illumination source (e.g., via a beam splitting optical system disposed between the multiple DMDs and the illumination source) to provide high-resolution adjustability of the illumination output signal. Other embodiments may include one or more tunable light emitting diodes (LEDs) that provide a tunable baseline spectral power distribution to the integrating sphere for additional customizability.

Other aspects provide for methods of calculating the subsets of the array of reflective elements of the DMD needed to generate the illumination output signal having a desired spectral power distribution. For example, certain aspects pertain to generating a calibration model of the illumination system by using different calibration subsets of the array of reflective elements of the DMD to direct different spectral portions of the illumination light into the integrating sphere in accordance with a calibration index. The illumination output signal generated with each different calibration subset may be measured to generate a calibration model that predicts the spectral power distribution of the illumination output signal as a function of the configuration of the activated subset of reflective elements of the DMD. The calibration model may then be used to calculate configurations for the DMD needed to produce the desired illumination output signal.

Referring now to FIG. 1, an illumination optical system 100 is schematically depicted. The illumination optical system 100 may be included in various illumination systems described herein configured to generate an illumination output signal 120 having a desired spectral power distribution of a user. The illumination optical system 100 is depicted to include an illumination source 102 that emits illumination light 103, conditioning optics 106, a dispersive optical element 108, focusing optics 110, a digital micromirror device (DMD) 112, collection optics 114, and an integrating sphere 116. It should be appreciated that the illumination optical system 100 may include various sets of optical elements consistent with the present disclosure and the depicted set of components is not intended to be limiting.

The illumination source 102 may include a high-luminance broad-band light source. As is understood in the art, the illumination output signal 120 is a result of the illumination light 103 input to the illumination optical system 100. As such, to produce a highly stable illumination output signal 120, the illumination source 102 should be highly stable and provide consistent operation both with respect to optical power and overall spectral power distribution over time and between power cycles. In embodiments, the illumination source 102 emits illumination light 103 that varies depending on spectral bands of interest of a user. For example, in some embodiments, the illumination optical system 100 may be configured to provide tunable illumination output signals 120 in the visible range. In such embodiments, the illumination source 102 may emit illumination light 103 above a threshold spectral radiance (e.g., greater than and including 1 mW/mm$^2$, greater than and including 5 mW/mm$^2$, greater than and including 10 mW/mm$^2$, greater than and including 50 mW/mm$^2$, greater than and including 100 mW/mm$^2$) throughout wavelengths in a range greater than or equal to 380 nm and less than or equal to 1100 nm. It should be understood that alternative embodiments may include an illumination source 102 emitting illumination light 103 throughout any wavelength range of interest consistent with the present disclosure. In one example, the wavelength range of interest is greater than or equal 380 nm and less than or equal to 780 nm. The illumination source 102 may comprise any hardware capable of producing illumination light 103 meeting such requirements. For example, in embodiments, the illumination source may include a white light emitting light emitting diode (LED) or a tungsten halogen filament.

In embodiments, the illumination source 102 emits illumination light above the threshold radiance even outside of a wavelength range of interest for a particular application to provide further flexibility for later use. For example, in embodiments, the illumination source 102 includes a laser-driven plasma light source (such as a laser-driven light source (LDLS™) produced by Enegetiq®) that produces light in the spectral band of 170 nm to 2100 nm having a spectral radiance of greater than and including 10 mW/mm$^2$ (e.g., approximately 10 mW/mm$^2$, approximately 40 mW/mm$^2$, approximately 100 mW/mm$^2$, approximately 60 mW/mm$^2$). Such laser-driven plasma light sources are beneficial over other existing light source (e.g., a tungsten halogen filament) in that they provide relatively bright illumination light over a broad spectral range while providing greater operational lifetime.

The conditioning optics 106 are shown to include condensing optics 105, an entrance slit 107, and collimating optics 109. The condensing optics 105 may include a plurality of optical elements (e.g., lenses, mirrors, spectral filters). For example, in some embodiments, the condensing optics 105 may include a spectral filter having a relatively high transmittance over a wavelength range of particular interest and a relatively low transmittance for wavelengths outside of the wavelength range. The optical elements of the condensing optics 105 may have a positive focal power to form an image of the illumination light at the entrance slit 107 that matches the area and aspect ratio of the entrance slit 107. In embodiments, the entrance slit 107 is a precision slit aperture electroformed in a thin metal plate. The entrance slit 107 may shape the illumination light 103 and eliminate undesired qualities in the illumination light 103 (e.g., eliminate abnormalities in beam shape caused by the condensing optics 105). Certain embodiments may not include the entrance slit 107 (e.g., in embodiments that include conditioning optics in the illumination source 102). It should be understood that the particular configuration of the condensing optics 105 depends upon the nature of the illumination light 103 output by the illumination source 102. The collimating optics 109 may include a lens system that collects light from the entrance slit 107 (when included) and collimates the illumination light 103. In embodiments, the condensing optics 105 and the collimating optics 109 produce a collimated illumination beam 111 for dispersion via the dispersive optical element 108. In embodiments, the optical powers of the condensing optics 105 and the collimating optics 109 may be selected to generate a collimated illumination beam 111 that is sized based on the configuration of the dispersive optical element 108 (e.g., based on a pitch of diffractive features in the dispersive optical element 108).

The dispersive optical element 108 is configured to separate the illumination light 103 into a plurality of spectral components. The dispersive optical element 108 may be any dispersive optical element, such as a reflective dispersive optical element (e.g., a reflection grating) or a transmissive optical element (e.g., a transmissive grating, a prism, etc.). In the depicted embodiment, the dispersive optical element 108 is a reflection grating including a reflective coating. In embodiments, the reflective coating may be based on the wavelength range of interest for the illumination optical system 100 to avoid absorbance of the collimated illumination beam 111 and optical losses. The dispersive optical element 108 converts the collimated illumination beam 111 into an angularly dispersed optical signal 113 where the spectral power density within the angularly dispersed optical signal 113 is dependent on location.

The focusing optics 110 includes at least one lens that collects the angularly dispersed optical signal 113 and focuses the angularly dispersed optical signal 113 into a spectral image 115. In embodiments, the DMD 112 is positioned with respect to the focusing optics 110 such that the spectral image 115 is formed on a surface of the DMD 112. The DMD 112 may include a micro-optical electromechanical system (MOEMS) that includes an array of reflective elements that can be individually rotated between activated states and inactivated states. For example, in embodiments, the DMD 112 includes a rectangular array of hundreds of thousands of microscopic mirrors that are individually activated or inactivated via a control system (not depicted). When in the activated state, the reflective elements reflect the spectral image 115 as a portion of a substantially flat reflective element towards the integrating sphere 116. When in an inactivated state, the reflective elements may reflect the spectral image 115 in a different direction such that the portions of the spectral image 115 overlapping the inactivated reflective elements are not directed towards the integrating sphere 116. As such, the particular subset of the array of reflective elements of the DMD 112 that is activated at a particular point in time determines the spectral components of a portion 117 of the spectral image 115 that is directed to an entrance port 118 of the integrating sphere 116 via collection optics 114 to generate the illumination output signal 120. Given this, by adjusting the subset of reflective elements of the DMD 112 that is activated, the wavelength range of the portion 117 may be adjusted and the spectral power distribution of the illumination output signal 120 may be tuned.

The collection optics 114 include at least one optical element that collects the portion 117 reflected from the DMD 112 and provides the portion 117 to an entrance port 118 of the integrating sphere 116. In embodiments, the integrating sphere 116 includes an interior surface defining a hollow spherical surface that is coated with a diffusive reflective coating. In embodiments, the diffusive reflective coating is specifically tailored to a wavelength range of interest of the illumination optical system 100 to minimize absorption. Light entering the entrance port 118 may undergo a plurality of reflections at the interior surface before exiting the integrating sphere via an exit port 104. Such multiple reflections off of the diffusive reflective coating produce a spatially uniform illumination output signal 120. In other words, the integrating sphere 116 eliminates any spatial dependency of spectral power distribution induced via the dispersive optical element 108. In embodiments, the integrating sphere 116 is constructed from a volume-diffusing material, such as Spectralon® material. For example, the integrating sphere 116 may be machined from such volume-diffusing material, which may reduce the need for a diffusive reflective coating.

In embodiments, the illumination optical system 100 includes an internal monitoring sensor 122 disposed at the interior surface of the integrating sphere 116. In embodiments, the internal monitoring sensor 122 is mounted to a side of the integrating sphere 116 to sample light reflecting off of an opposing portion of the internal surface of the integrating sphere. In embodiments, the internal monitoring sensor 122 includes a spectrometer configured to measure any number of channels (e.g., frequency bands) of the portion 117 of the spectral image 115 directed into the integrating sphere 116. As described in greater detail herein, the internal monitoring sensor 122 may be used to calibrate and stabilize the illumination optical system 100 such that the illumination optical system 100 generates a temporally and spectrally stable illumination output signal 120 that corresponds to an input provided by a user.

In embodiments, internal monitoring signals generated via the internal monitoring sensor 122 may be correlated to the illumination output signal 120 based on a model of the optical properties of the integrating sphere 116. As such, the internal monitoring sensor 122 may provide real-time information that may be used to adjust control points of the illumination optical system 100, such as settings of the DMD 112, to tune or fine-tune the illumination output signal 120. In embodiments, the internal monitoring signals generated via the internal monitoring sensor 122 may be used to compensate for factors (e.g., external geometry, external light sources) externally impacting the illumination output signal 120.

The internal monitoring sensor 122 may be sensitive to thermal fluctuations caused by changes in the ambient environment of the illumination optical system 100. In embodiments, the illumination optical system 100 includes a temperature sensor (not depicted). The temperature sensor may be disposed proximate to the internal monitoring sensor 122 to precisely monitor the conditions encountered by the internal monitoring sensor 122. In embodiments, the illumination optical system 100 includes a temperature conditioning circuit (e.g., including a fan and thermo-electric heating and cooling element) configured to counteract changes in temperature measured via the temperature sensor within the integrating sphere 116 to maintain accuracy in measurements by the internal monitoring sensor 122. In embodiments, a similar temperature conditioning circuit may be provided for the illumination source 102, as well as any other temperature-dependent components of the illumination optical system 100.

In embodiments, components of the illumination optical system 100 (e.g., the illumination source 102, the conditioning optics 106, the a dispersive optical element 108, focusing optics 110, the a digital micro-mirror device (DMD) 112, and the collection optics 114) are disposed in a casing 124. The casing 124 protects the components of the illumination optical system 100 from external debris and prevents light from external sources from entering the integrating sphere 116 and altering the spectral distribution in the illumination output signal 120. In embodiments, the exit port 104 is covered by a transparent window (not depicted) to limit exposure of the interior of the integrating sphere 116 to external debris.

Referring now to FIG. 2A, an illumination system 200 is schematically depicted. In embodiments, the illumination system 200 incorporates the illumination optical system 100 described with respect to FIG. 1. As depicted, the illumination system 200 includes a control system 202, a communications interface 206, and an external monitoring sensor 204. As described herein, the illumination system 200 facilitates calibration and tuning of the illumination optical system 100 to produce a desired illumination output signal 120.

The control system 202 is communicably coupled to the DMD 112, the internal monitoring sensor 122, and the external monitoring sensor 204. In the embodiments described herein, the control system 202 includes a processor 210 communicatively coupled to a memory 212. The processor 210 may include any processing component(s), such as a central processing unit or the like, configured to receive and execute computer readable and executable instructions stored in, for example, the memory 212. In the embodiments described herein, the processor 210 of the control system 202 is configured to provide control signals to the DMD 112 to activate different subsets of the reflective elements therein to adjust the spectral power distribution of the illumination output signal 120. The control system 202 may also be configured to receive signals from the internal monitoring sensor 122 and the external monitoring sensor 204 to perform the calibration, tuning, and stabilization methods described herein.

In embodiments, computer readable and executable instructions for controlling the illumination system 200 are stored in the memory 212 of the control system 202. The memory 212 is a non-transitory computer readable memory. The memory 212 may be configured as, for example and without limitation, volatile and/or nonvolatile memory and, as such, may include random access memory (including SRAM, DRAM, and/or other types of random access memory), flash memory, registers, compact discs (CD), digital versatile discs (DVD), and/or other types of storage components.

In embodiments, the control system 202 includes a database 214. The database 214 may generally comprise a data storage component communicably coupled to the processor 210. As a non-limiting example, the database 214 may include one or more database servers that support NoSQL, MySQL, Oracle, SQL Server, NewSQL, and/or the like. The database 214 stores data which may include system state settings and configuration data such as device addresses, DMD size, DMD pixel wavelength index, DMD spectral and power uniformity mapping, DMD operating parameters, and spectrometer/sensor calibration factors. The processor 210 may recall such stored data over the course of executing the various processes and performance of the various functions described herein. In embodiments, the database 214 stores operational settings such as DMD size, monitoring sample rates (e.g., rates at which readings from the internal monitoring sensor 122 are taken), and other system files such history logs, wavelength calibration data, tuning settings, and solution files (e.g., DMD parameters used to produce illumination output signals 120 having particular target spectral power distributions, etc.).

The external monitoring sensor 204 is coupled to a collection element 208 configured to collect at least a portion of the illumination output signal 120. In embodiments, the collection element 208 includes a spectrometer fiber positioned as if the spectrometer fiber was a device under test (DUT) in a use case for the illumination optical system 100 (e.g., the DUT may be a sensor being calibrated via the illumination optical system 100). The collection element 208 provides the collected portion of the illumination output signal 120 to the external monitoring sensor 204. In embodiments, the external monitoring sensor 204 is a calibration spectrometer configured to measure various spectral components of the collected portion of the illumination output signal 120. Measurements made via the external monitoring sensor 204 may be provided to the control system 202 for calibration and tuning of various aspects of the illumination optical system 100, as described herein.

The communications interface 206 may be a machine interface providing bi-directional communication to an external computing system 216. In embodiments, the communications interface 206 may be defined by a command-response definition and utilize one or more physical interface connections or protocols including RS-232, USB, and TCP. In embodiments, the communications interface 206 may connect to the external computing system 216 through which a user of the illumination system 200 may provide various inputs to the control system 202.

Figure 2B:
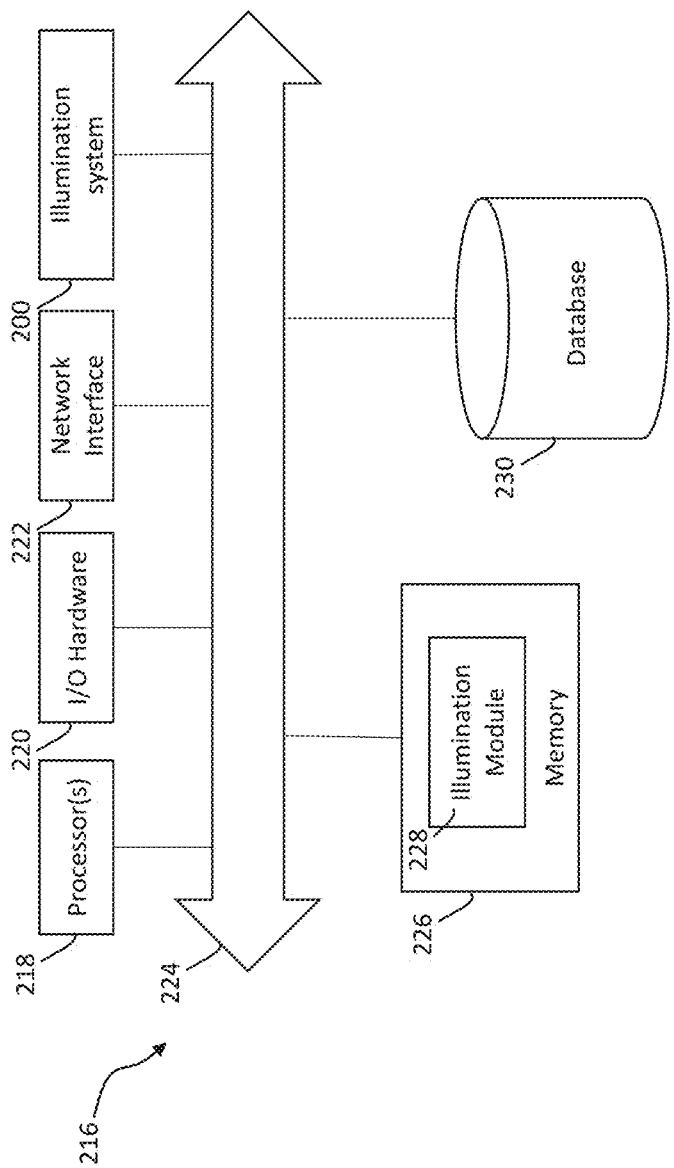
FIG. 2B schematically depicts an external computing system in communication with the illumination system depicted in FIG. 2A, according to one or more embodiments described herein.

With reference to FIG. 2B, an example embodiment of the external computing system 216 is depicted. The external computing system 216 includes a processor 218, input/output ("I/O") hardware 220, a network interface 222, a communications bus 224, a memory 226, and a database 230. While the external computing system 216 is shown to include a single processor 218, it should be appreciated that the external computing system 216 may include any number of processors depending on the implementation. The processor 218 can include any suitable processing device, such as a microprocessor, microcontroller, integrated circuit, logic device, and/or other suitable processing device. In embodiments, the processor 218 is a processing circuit (e.g., either a single processing circuit or a group processing circuit) that executes some or all of the machine-readable instructions from multiple modules of one or more non-transitory computer-readable mediums (e.g., the memory 226).

I/O hardware 220 may include at least one element to receive inputs from a user and/or provide results of the computations performed via the external computing system 216 to a user. For example, in embodiments, the I/O hardware 220 may include a basic input/output system (BIOS) that interacts with hardware of the external computing system 216, device drivers that interact with particular devices of the external computing system 216, one or more operating systems, user applications, background services, background applications, and the like. The network interface 222 can include any suitable components for interfacing with one or more network(s), including for example, transmitters, receivers, ports, controllers, antennas, and/or other suitable components. The network interface 222 may include and/or be configured to communicate with any wired or wireless networking hardware, including an antenna, a modem, a LAN port, a wireless fidelity (Wi-Fi) card, a WiMax card, a long term evolution (LTE) card, a ZigBee card, a Bluetooth chip, a USB card, mobile communications hardware, and/or other hardware for communicating with other networks and/or devices. The database 230 may generally comprise a data storage component communicably coupled to the processor 218 via the communication bus 224. As a non-limiting example, the database 230 may include one or more database servers that support NoSQL, MySQL, Oracle, SQL Server, NewSQL, and/or the like.

The memory 226 is communicatively coupled to the processor 218. As a non-limiting example, the memory 226 may comprise one or more non-transitory computer-readable medium that may be one of a shared memory circuit, dedicated memory circuit, or group memory circuit. Non-limiting examples of the memory include random access memory (including SRAM, DRAM, and/or other types of random access memory), read-only memory (ROM), flash memory, registers, compact discs (CD), digital versatile discs (DVD), and/or other types of storage components. Memory 226 may store instructions accessible to the processor 218 via an addressing scheme such that the processor 218 may access the memory 226 to execute the instructions in accordance with a program to perform any of the functions and operations described herein.

The memory 226 is shown to include an illumination module 228. In embodiments, the illumination module 228 is a computer application (e.g., a native application stored in the memory 226, a web application accessed via the network interface 222, or a computer application using any front end-back end implementation) through which the external computing system 216 interacts with control system 202 to facilitate a user interacting with the illumination system 200. In embodiments, the illumination module 228 is configured to receive various inputs from the user (e.g., target spectral power distributions, requested data) and present the user with information regarding an operational state of the illumination system 200.

Figure 3:
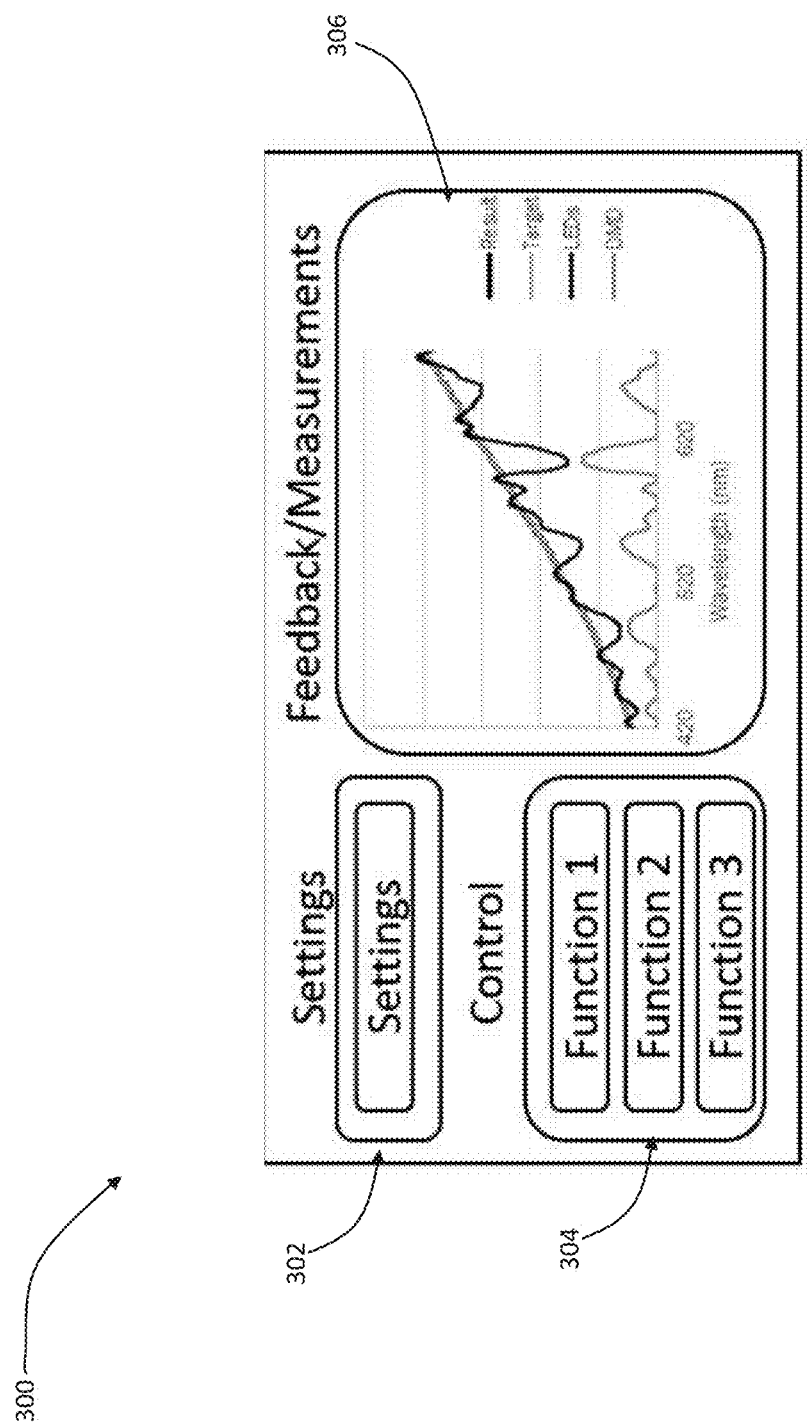
FIG. 3 depicts an example graphical user interface through which a user may interact with the illumination system depicted in FIG. 2A, according to one or more embodiments described herein.

FIG. 3 depicts an example graphical user interface 300 generated via the illumination module 228 of the external computing system 216. As depicted, the graphical user interface 300 includes a settings portion 302, a functions portion 304, and a feedback portion 306. In embodiments, the feedback portion 306 depicts a spectral power distribution of the illumination output signal 120 (e.g., measured via the external monitoring sensor 204) and a target spectral power distribution. Via the functions portion 304, the user may access information regarding the operational state of the illumination system 200 and provide various inputs to the control system 202. In various embodiments, functions of the software application rendered accessible via the function portion 304 include, but are not limited to: read internal or external sensor measurements, read temperature measurements (e.g., certain embodiments may include a temperature sensor disposed in system enclosure to measure a temperature of the internal monitoring sensor 122 to implement a temperature correction via the control system 202), read calculated values (e.g., colorimetric values, error values regarding a difference between the illumination output signal 120 and a target), read system state (device settings/state, time logs, serial numbers), calibrate sensor (e.g., calibrate the internal monitoring sensor 122 via the external monitoring sensor 204), calibrate spectrometer (e.g., calibrate the external monitoring sensor 204 using a known illumination source 102), calibrate DMD, characterize DMD, save/recall solutions (e.g., settings defining specific illumination output signal 120 or result of tuning process), save/recall system settings, load a "target" spectral power distribution, run spectral tuning, run spectral or intensity feedback, set system device temperature target, set DMD settings/pixel map, and export values to file. As such, the graphical user interface 300 may enable a user to provide an input to the control system 202 to define a target spectral power distribution for the illumination output signal 120, and enable the user to run various ones of the processes described herein to facilitate tuning and calibration of the illumination optical system 100.

The illumination optical system 100 described with respect to FIGS. 1 and 2 only include a single illumination source 102 and only provided a single adjustable portion 117 of a spectral image 115 to the integrating sphere 116. It should be appreciated that various alternative arrangements are envisioned. Various embodiments may include additional illumination sources to facilitate operation over broader spectral ranges.

Figure 4:
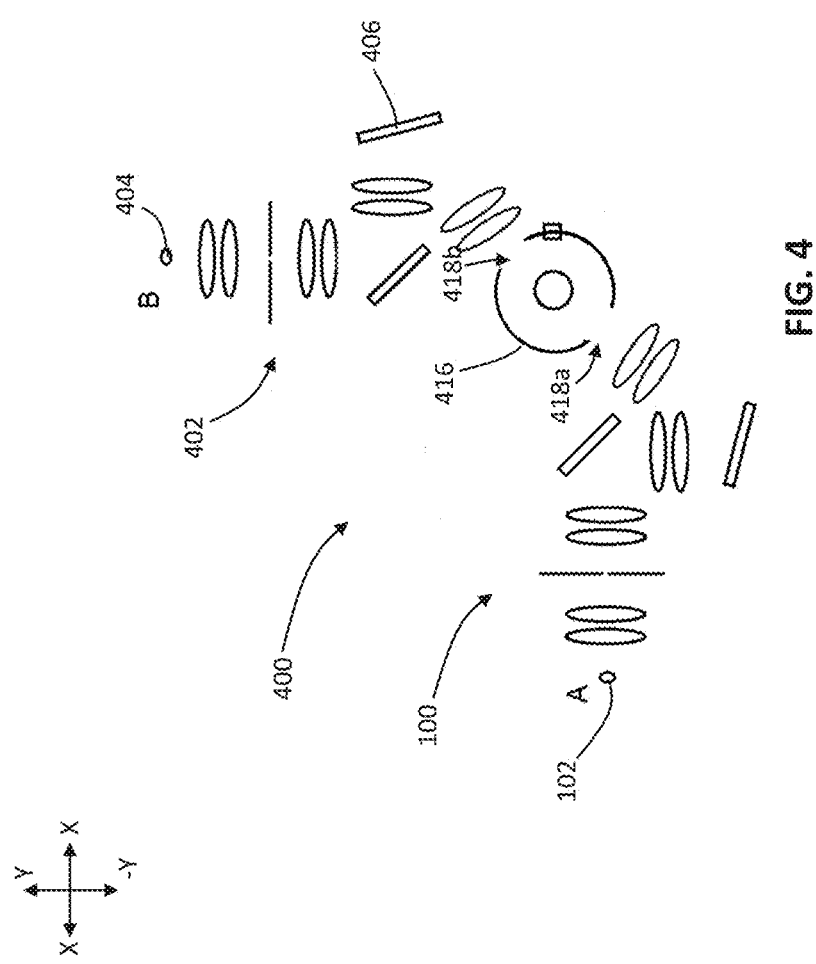
FIG. 4 schematically depicts an illumination optical system, according to one or more embodiments described herein.

FIG. 4 schematically depicts an illumination optical system 400. The illumination optical system 400 incorporates the illumination optical system 100 described with respect to FIG. 1, with the exception that the integrating sphere 116 is replaced with the integrating sphere 416, which may be similar to the integrating sphere 116. The integrating sphere 416 includes a first entrance port 418a for receiving illumination light from the illumination source 102. The integrating sphere 416 includes a second entrance port 418b for receiving illumination light from a second illumination optical system 402.

The second illumination optical system 402 may be similar in structure to the illumination optical system 100 described herein with respect to FIG. 1 (e.g., including conditioning optics, a dispersive optical element, focusing optics, a DMD, and collection optics, arranged as described herein with respect to the illumination optical system). As such, the second illumination optical system 402 includes a second DMD 406 that directs illumination light from a second illumination source 404 into the integrating sphere 416 via the second entrance port 418b. In embodiments, the second illumination source 404 is identical to the illumination source 102 described with respect to FIG. 1. In embodiments, the second illumination source 404 is different from the illumination source 102. For example, in embodiments, the second illumination source 404 may emit illumination light associated with a first portion of a wavelength range of interest while the illumination source 102 may emit illumination light associated with a second portion of the wavelength range of interest such that, in combination, the illumination sources 102 and 404 emit illumination light encompassing an entirety of the wavelength range of interest. Such an arrangement beneficially creates flexibility in using a wide variety of illumination sources having a wide range of capabilities. Moreover, the addition of the second DMD 406 provides additional flexibility such that high resolution spectral power distributions may be generated.

The addition of the second illumination optical system 402 (e.g., including the second DMD 406) is beneficial in that each illumination optical system (e.g., both the first and second illumination optical systems 100 and 402) may be tuned to specific wavelength ranges specifically to avoid $2^{nd}$ (or more) order effects inherent in the DMDs 406 and 112. For example, if a single diffracted beam covering a wide spectral range (e.g., greater than or equal to 380 nm and less than or equal to 1100 nm) is convergent on the DMD 112, some light at 400 nm within the diffracted beam may end up in the same spatial location as light at 800 nm within the diffracted beam due to second order diffraction. Such overlapping of spectral components may be counteracted by filtering, but such an approach may result in signal power loss. Incorporation of the second illumination optical system 402 provides the benefit that illumination light may be split (e.g., via the beam splitting optical system 500 described herein with respect to FIG. 5) such that the DMDs 112 and 406 each receive illumination light within a narrower spectral range so light diffracted by each of the DMDs 112 and 406 does not overlap a second order. For example, in one embodiment, the DMD 112 diffracts light in a wavelength range from 380 nm to 720 nm, while the DMD 406 diffracts light in a wavelength range from 700 nm to 1100 nm. This way, the light within each of the illumination optical systems 100 and 402 overlaps in spectral range to provide uniform spectral coverage, but neither of the DMDs 112 and 406 diffracts light that overlaps with a $2^{nd}$ order diffraction.

Figure 5:
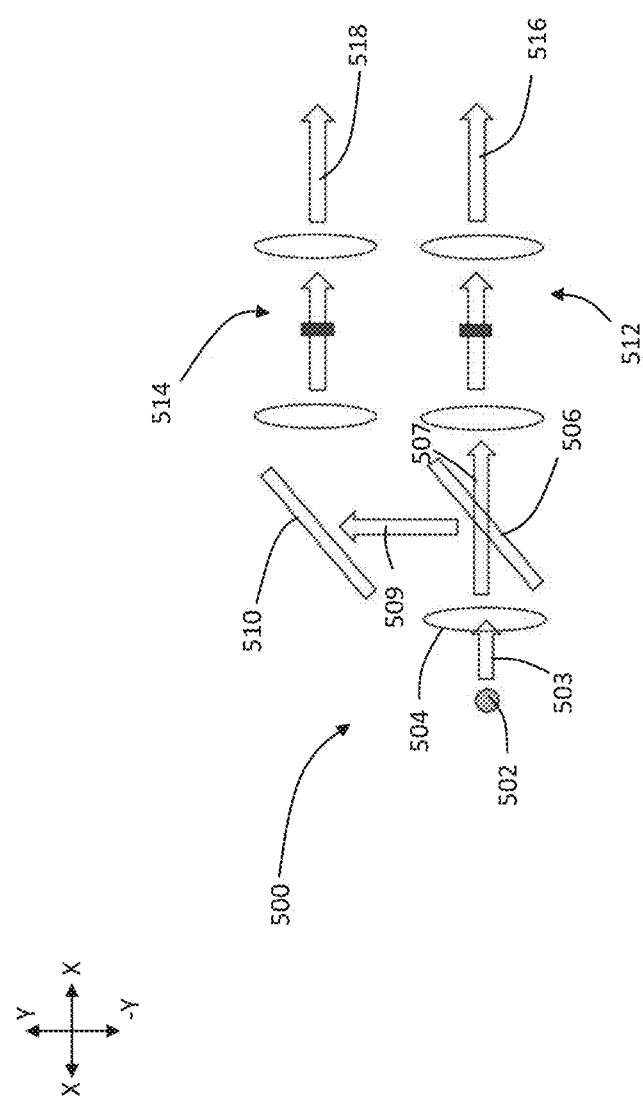
FIG. 5 schematically depicts a beam splitting optical system for use in an illumination optical system, according to one or more embodiments described herein.

Other embodiments may use a single illumination source to provide illumination light to multiple illumination optical systems. For example, FIG. 5 schematically depicts a beam splitting optical system 500. The beam splitting optical system 500 includes a beam splitting optical element 506 that transmits a first portion 507 of illumination light 503 from an illumination source 502 and reflects a second portion 509 of the illumination light 503. In embodiments, the beam splitting optical system 500 includes collimating optics 504 disposed between the illumination source 502 and the beam splitting optical element 506. A reflector 510 may re-direct the second portion 509 such that the second portion 509 travels in a direction substantially parallel to the first portion 507. First and second conditioning optics 512 and 514 (e.g., similar in structure to the conditioning optics 106 described with respect to FIG. 1) may generate first and second collimated illumination beams 516 and 518. The first and second collimated illumination beams 516 and 518 may then be provided to portions of the illumination optical systems 100 and 402 described with respect to FIG. 4 (e.g., each including a dispersive optical element, focusing optics, a DMD, and collection optics) to provide separate spectrally tunable portions of illumination light to the integrating sphere 416. In other words, the beam splitting optical system 500 may replace the illumination sources 102 and 404 and the conditioning optics of the illumination optical systems 100 and 402 described with respect to FIG. 4. In another embodiment, the beam splitting optical system 500 does not include the first and second conditioning optics 512 and 514, and the first collimated illumination beam 516 is provided to the illumination optical system 100 depicted in FIG. 4 (with the illumination source 102 removed), and the second collimated illumination beam 516 is provided to the illumination optical system 402 depicted in FIG. 4 (with the illumination source 404 removed).

In embodiments, the first portion 507 and the second portion 509 may spectrally overlap with one another. For example, the beam splitting optical element 506 may be a filter-based beam splitter that does not have a perfect cutoff transition between a spectral band that is reflected (e.g., the second portion 509) and a spectral band that is transmitted (e.g., the first portion 507). In such embodiments, the illumination optical systems 100 and 402 may both be configured to operate within this area of spectral overlap. In an example, the illumination optical system 100 (or a portion thereof if the first conditioning optics 512 are present) receives the first portion 507 and operates between 380 nm and 740 nm, and the second illumination optical system 402 receives the second portion 509 and operates between 725 nm and 1050 nm. In other words, the overlapping range is covered by both illumination optical systems 100 and 402 such that the combined output of the integrating sphere 416 is continuous throughout the wavelength range of 380 nm to 1050 nm.

Figure 6:
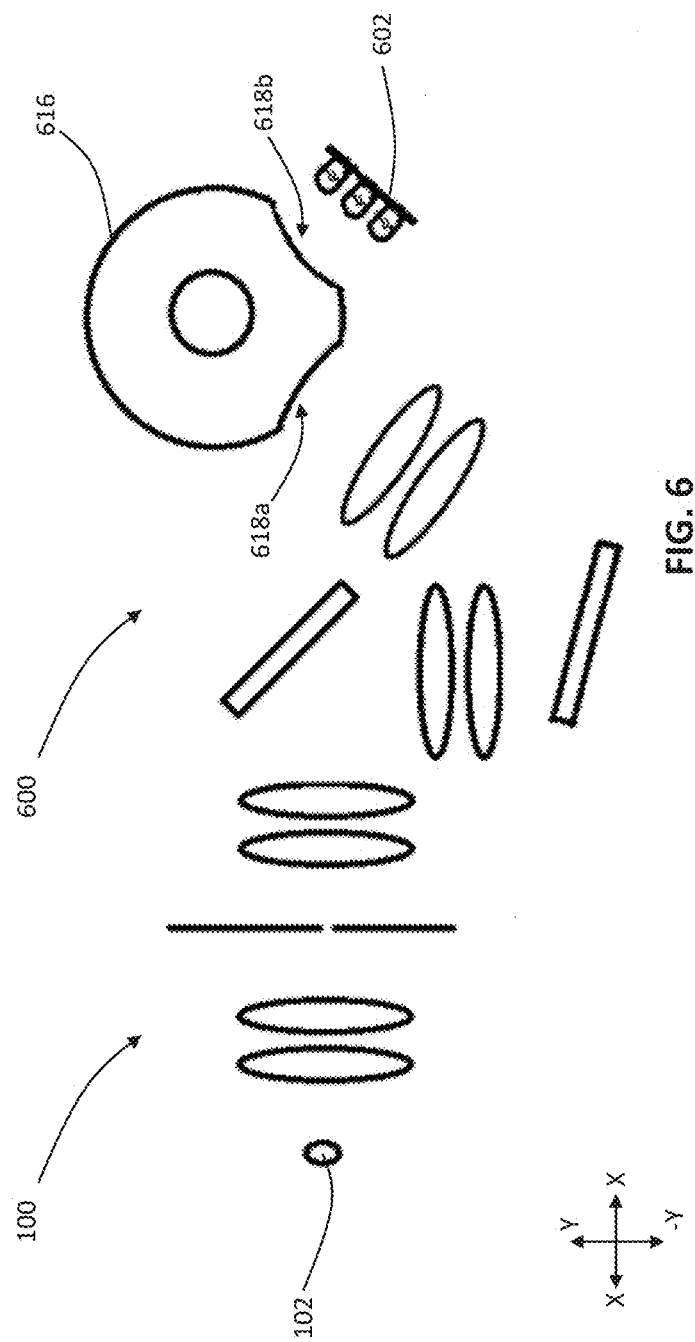
FIG. 6 schematically depicts an illumination optical system, according to one or more embodiments described herein.

FIG. 6 depicts another embodiment of an illumination optical system 600 having multiple illumination sources. The illumination optical system 600 incorporates the illumination optical system 100 described with respect to FIG. 1, with the exception that the integrating sphere 116 is replaced with the integrating sphere 616. The integrating sphere 616 may be similar in structure to the integrating sphere 116, and include a first entrance port 618a for receiving illumination light from the illumination source 102. The integrating sphere 616 also includes a second entrance port 618b for receiving illumination light from an additional illumination source 602. The illumination source 602 emits illumination light directly into the second entrance port 618b to add a baseline spectral power distribution to the portion of illumination light from the illumination source 102 provided by the illumination optical system 100.

The illumination source 602 may vary depending on the implementation. For example, in embodiments, the illumination source 602 includes a broad-band light source covering a spectral band at least as wide as the illumination source 102. In such embodiments, the illumination source 602 may include a white light LED or a tungsten halogen source. Alternatively or additionally, the illumination source 602 may emit illumination light having a narrower bandwidth than the illumination source 102 and include, for example, a monochromatic LED or a laser diode. In embodiments, the illumination optical system 600 may include a plurality of additional illumination sources to add power to a combined illumination output signal of the integrating sphere 616. In embodiments, the illumination source 602 is adjustable to provide for additional output flexibility. For example, in embodiments, the illumination source 602 includes a plurality of light sources (e.g., LEDs), with each of the light sources covering a particular sub-range of interest (e.g., a portion of the wavelength range of interest). In one example, the illumination source 602 includes an array of 16 LEDs, with each LED emitting illumination light in a different (overlapping in some embodiments) portion of a wavelength range of interest (e.g., between 400 nm and 700 nm). In embodiments, the outputs of each of these LEDs may be individually tuned to provide an adjustable baseline illumination (e.g., in power, in spectral band, and/or in both power and spectral band). Light from the illumination system 102 (e.g., via adjustment of the DMD mirrors) may be used to fine-tune the baseline illumination to have an output spectral power distribution of choice. In embodiments, the control system 202 may control both the illumination system 102 (e.g., via settings of the DMD 112) in combination with the illumination source 602 to provide an illumination output having a desired spectral power distribution. By providing illumination light from both the illumination source 102 and the illumination source 602 to the integrating sphere 616, the illumination optical system 600 may increase the optical power of the illumination output signal over embodiments including only a single illumination source.

Figure 7:
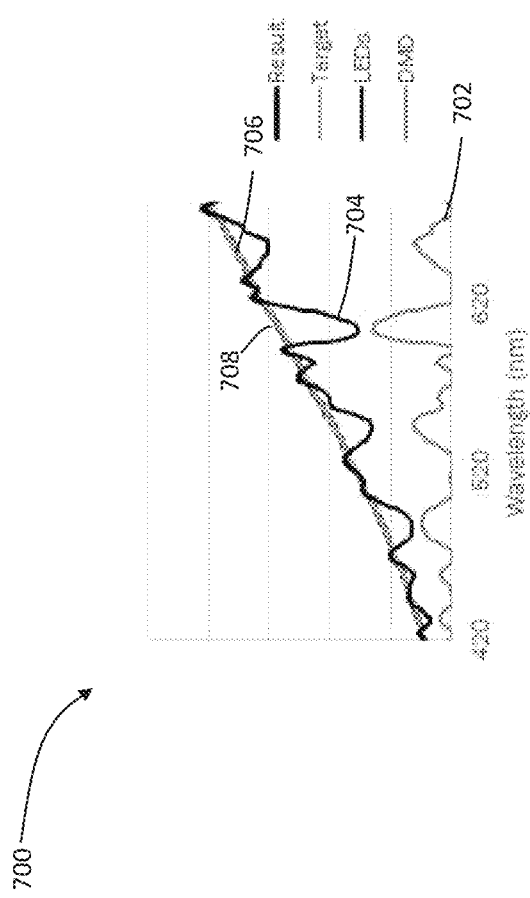
FIG. 7 depicts a chart including measured and target power spectral distributions for an illumination optical system, according to one or more embodiments described herein.

FIG. 7 depicts a chart 700 showing a first spectral power distribution 702, a second spectral power distribution 704, a combined spectral power distribution 706, and a target spectral power distribution 708. The first spectral power distribution 702 represents an illumination output signal of the illumination optical system 600 without the illumination source 602 providing illumination light to the integrating sphere 616 (e.g., measured via the external monitoring sensor 204 described with respect to FIG. 2A). In other words, the first spectral power distribution 702 is derived only from the illumination optical system 100 (e.g., via an activated subset of reflective elements of the DMD 112). The second spectral power distribution 704 represents an illumination output signal of the illumination optical system 600 without the illumination source 102 providing illumination light to the integrating sphere 616. In other words, the second spectral power distribution 704 is derived only from the illumination source 602. The combined spectral power distribution 706 substantially matches the target spectral power distribution 708 (e.g., input by a user via the user interface 300 described herein with respect to FIG. 3). The combined spectral power distribution 706 is generated using illumination light from both the illumination source 102 and the illumination source 602. As depicted, the addition of the illumination source 602 significantly increases power level throughout the spectral range.

It should be appreciated that any of the illumination optical systems 100, 400, and 600 and various modifications thereof (e.g., modified using the beam splitting optical system 500 depicted in FIG. 5) may be used in the illumination system 200 described with respect to FIG. 2A in place of the illumination optical system 100. Depending on the implementation, any number of illumination sources having varying levels of adjustability may be used consistent with the present disclosure.

Referring back to FIG. 2A, given that variations in performance of the illumination source 102 may cause variances in the illumination output signal 120 and therefore require changes in DMD settings to produce a desired illumination output signal 120, it is necessary to calibrate the illumination optical system 100 to identify such DMD settings (e.g., particular activated subsets of the DMD 112 needed to generate a particular illumination output signal 120). In the example shown, the illumination system 200 includes a collection element 208 positioned at the exit port 104 of the integrating sphere 116. The collection element 208 provides a portion of the illumination output signal 120 to the external monitoring sensor 204 for spectral analysis and calibration in accordance with the methods described herein.

In embodiments, even after the illumination optical system 100 is calibrated for a particular illumination source 102, temporal variations in the illumination source 102 may induce variations in the illumination output signal 120. To identify such temporal variations in the illumination source 102, the illumination optical system 100 includes the internal monitoring sensor 122 to provide continuous feedback monitoring. In embodiments, the internal monitoring sensor 122 includes an internal spectrometer that measures the spectral power density of only a portion of the light present in the integrating sphere 116. In order to expand the internal monitoring signal generated via the internal monitoring sensor 122 across all wavelengths in a range of interest, various responses of the internal monitoring sensor 122 resulting from different configurations of the DMD 112 may be taken to generate an internal calibration model for the internal monitoring sensor 122.

In embodiments, an external calibration performed via the external monitoring sensor 204 may be transferred to the internal monitoring sensor 122 via generating a set of calibration transfer factors modeling the relationship between responses measured via the internal monitoring sensor 122 and the external monitoring sensor 204. In embodiments, the calibration transfer factors may be generated via an internal calibration source disposed in the integrating sphere 116.

FIG. 8 schematically depicts a portion of an illumination system 800. In embodiments, the illumination system 800 may correspond to the illumination system 200 described herein with respect to FIG. 2A. The illumination system 800 comprises an integrating sphere 802 having a calibrating light source 804 and an internal monitoring sensor 806 disposed therein. The internal monitoring sensor 806 may correspond to the internal monitoring sensor 122 described herein with respect to FIGS. 1-2. The calibrating light source 804 is a calibration transfer standard, or provides temporally stable calibration light that may be used to calibrate the internal monitoring sensor 806. To ensure that the internal monitoring sensor 806 provides an accurate representation of the illumination output signal, the internal monitoring sensor 806 may be calibrated by measuring a calibration signal generated by the external monitoring sensor 810 via the calibrating light source 804.

In embodiments, calibration factors for the internal monitoring sensor 806 may be generated based on a response of the integrating sphere 802 to the calibrating light source 804 measured via an external monitoring sensor 810. The external monitoring sensor 810 may correspond to the external monitoring sensor 204 described herein with respect to FIG. 2A. In the depicted embodiment, for example, the external monitoring sensor 810 is coupled to a collection element 808 (e.g., a spectrometer fiber) positioned proximate to an exit port 812 of the integrating sphere 802. The collection element 808 provides a portion of the illumination output of the integrating sphere 802 to the external monitoring sensor 810 (e.g., spectrometer) that measures the spectral components of the illumination output. In embodiments, the control system 202 (e.g., in the memory 212) stores a calibration response generated by the external monitoring sensor 810 in response to the calibrating light source 804 illuminating the internal surface of the integrating sphere 802. In embodiments, the internal monitoring sensor 806 may be calibrated in-situ at any time (e.g., just prior to the illumination system 200 being used for its intended purpose, such as to calibrate another sensor) by measuring the internal monitoring signal generated via the internal monitoring sensor 806 responsive to illumination with the calibrating light source 804, and comparing the measured internal monitoring signal to the stored calibration response of the external monitoring sensor 810 to generate a set of calibration factors for the internal monitoring sensor 806.

Figure 9A:
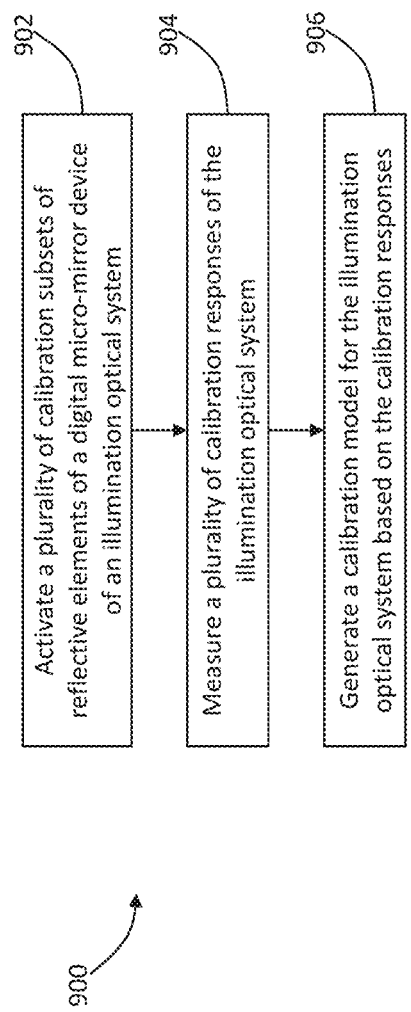
FIG. 9A depicts a flow diagram of a method of generating a calibration model for an illumination optical system, according to one or more embodiments described herein.

Referring now to FIG. 9A, a flow diagram of a method 900 of generating a calibration model for an illumination optical system is depicted. In embodiments, the method 900 may be performed via the illumination system 200 described herein. Performance of the method 900 facilitates calibration and tuning of the illumination optical system 100 (or any alternative embodiments thereof described herein) by generating a model that predicts spectral output of the illumination optical system 100 as a function of the subset of reflective elements of the DMD 112 that is activated. In embodiments, the external monitoring sensor 204 may be used to generate calibration signals used in the generation of the calibration model. In embodiments, the method 900 may be performed without the external monitoring sensor 204. For example, the method 900 may be performed via the internal monitoring sensor 122 of the illumination optical system 100. In embodiments, the method 900 may be performed via the internal monitoring sensor 122 after the internal monitoring sensor 122 is calibrated via the process described herein with respect to FIG. 8 (e.g., after measuring an internal calibration signal generated via illuminating the integrating sphere 116 with a calibrating light source like the calibrating light source 804 described with respect to FIG. 8, and comparing the internal calibration signal with a historical calibration signal previously measured based on a response of an external monitoring sensor to the calibrating light source 804).

In a step 902, the control system 202 (e.g., via instructions stored in the memory 212 and executed via the processor 210) activates a plurality of calibration subsets of the reflective elements of the DMD 112. In embodiments, the calibration subsets are subsets of the array of reflective elements of the DMD 112 having predetermined shapes (e.g., in accordance with a calibration index). The predetermined shapes may depend on the configuration of the DMD 112 and may vary depending on the implementation. For example, referring back to FIG. 1, the angularly dispersed optical signal 113 generated via the dispersive optical element 108 may spectrally decompose the collimated illumination beam 111 into a plurality of spectral components that are separated from one another in a first direction (e.g., in the X-direction shown in FIG. 1). The focusing optics 110 may focus such spectral components into a spectral image 115 on the surface of the DMD 112. The spectral image 115 may include a plurality of linear regions corresponding to the various spectral components of the illumination light 103, with the linear regions extending in a second direction (e.g., the Z-direction—into the page—depicted in FIG. 1) that is perpendicular to the first direction. While each spectral component of the illumination light 103 within the spectral image 115 is described herein as possessing a substantially linear shape, it should be appreciated that alternative shapes are envisioned and may be used consistent with the present disclosure. For example, in embodiments, each spectral component follows a curve with respect the Z-direction.

In embodiments, each calibration subset of the DMD 112 that is sequentially activated during the step 902 may be positioned to reflect a separate one of the linear regions of the spectral image 115 corresponding to the spectral components of the illumination light 103. In other words, each calibration subset may be shaped to correspond to a size of each linear region within the spectral image 115. In embodiments, each calibration subset is shaped to correspond to each spectral component of the spectral image 115. As such, in implementations where each spectral component follows a curved contour, each calibration subset may be similarly shaped (e.g., in the Z-direction). As such, each calibration subset may be sized based on the optical configuration of the dispersive optical element 108, focusing optics 110, and the DMD 112. For instance, depending on the spacing between the focusing optics 110 and the dispersive optical element 108, and the optical power of the focusing optics 110, the size of each spectral component within the spectral image 115 may vary, and therefore impact a size and arrangement of each calibration subset.

Referring to FIG. 9B, an exemplary configuration of a plurality of reflective elements 908 of the DMD 112 is schematically depicted. As depicted, the plurality of reflective elements 908 is a rectangular array of independently adjustable reflective elements extending in the first direction (e.g., the X-direction depicted in FIG. 9B) and the second direction (e.g., the Y-direction depicted in FIG. 9B). An axis 910 of the plurality of reflective elements 908 extending in the first direction is a wavelength axis in this example because the dispersive optical element 108 separates different spectral components of the illumination light 103 in the first direction. Given this, the spectral components of the illumination light 103 incorporated into the illumination output signal 120 depends on the combination of reflective elements activated along the axis 910. An axis 912 of the plurality of reflective elements 908 extending in the second direction is an amplitude axis in this example because the portion of a particular linear region within the spectral image 115 that is provided to the integrating sphere 116 depends on a number of reflective elements activated along the axis 912. In other words, the particular wavelength composition of the light provided to the integrating sphere 116 may depend on an arrangement of reflective elements activated along the axis 910, while the amplitude of the light at a particular wavelength depends on the arrangement of reflective elements activated along the axis 912.

The plurality of reflective elements 908 is depicted to have a single calibration subset of reflective elements 914 activated. In the example depicted, the calibration subset of reflective elements 914 includes a plurality of adjacent columns of the plurality of reflective elements 908. Referring back to FIG. 9A, in the step 902, the control system 202 may sequentially activate a plurality of calibration subsets having a similar shape to the calibration subset of reflective elements 914 until an entirety of the plurality of reflective elements 908 has been activated. Put differently, the control system 202 may translate the calibration subset of reflective elements in the first direction to change region of the spectral image 115 that is directed to the integrating sphere 116. Such an approach may generally characterize the illumination optical system 100 by indicating the wavelengths incorporated into the illumination output signal 120 as a function of column (or group of columns) of the plurality of reflective elements 908 that are activated.

Figure 9D:
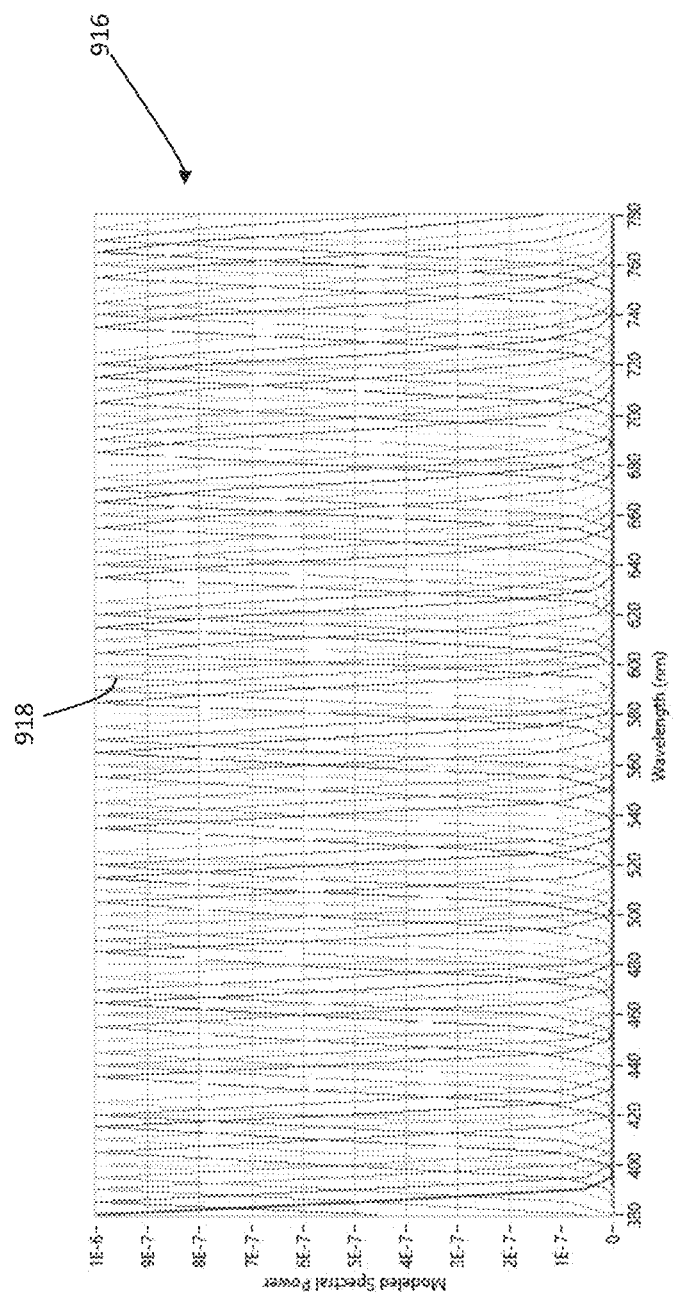
FIG. 9D depicts a calibration model for an illumination optical system generated via the method depicted in FIG. 9A, according to one or more embodiments described herein.
Figure 9E:
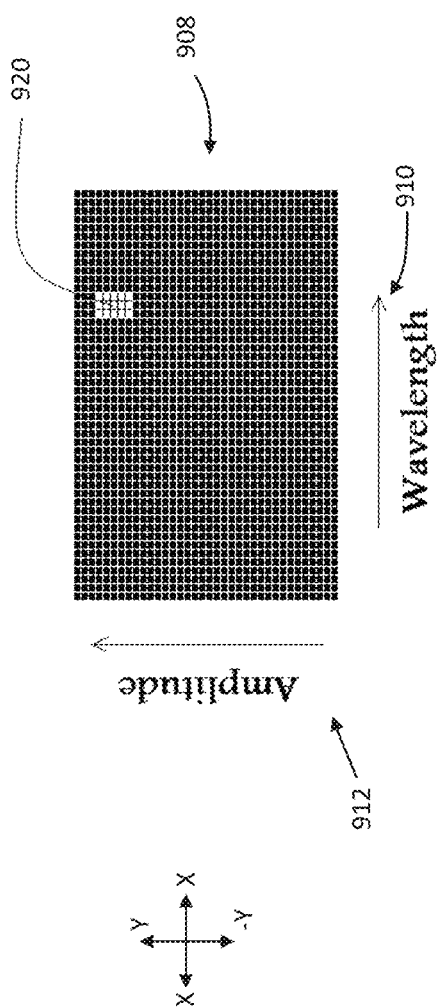
FIG. 9E schematically depicts another calibration subset of the plurality of reflective elements of the digital micro-mirror device depicted in FIG. 9B that may be used during the method depicted in FIG. 9A, according to one or more embodiments described herein.

Various alternative approaches may be used in terms of the configuration of the calibration subset of reflective elements that are sequentially activated to characterize the DMD 112. For example, FIG. 9E depicts an alternative arrangement of an activated calibration subset of reflective elements 912 for the plurality of reflective elements 908. The calibration subset of reflective elements 920 is a rectangular sub-array having substantially the same width (e.g., in the x-direction) as the calibration subset of reflective elements 914 described with respect to FIG. 4B, but not extending throughout the entirety of the plurality of reflective elements in the second direction (e.g., the Y-direction depicted in FIG. 9E). As described herein, an arrangement for the calibration subset such as that depicted in FIG. 9E may facilitate generation of a more detailed characterization of the DMD 112 to facilitate more precise tuning of the illumination optical system 100. For example, referring back to FIG. 9A, in the step 902, the control system 202 may sequentially activate calibration subsets having a similar shape to the calibration subset of reflective elements 920 (e.g., in both the first and second directions) until each pixel of the DMD has been activated as a part of one of the calibration subsets.

In a step 904, a plurality of calibration responses of the illumination optical system 100 are measured. For example, in embodiments, an external monitoring sensor 204 may measure a spectral power distribution of the illumination output signal 120 for each calibration subset of reflective elements that is activated during the step 902. In embodiments, the internal monitoring sensor 122 may measure a calibration signal bearing a relationship to the spectral power distribution of the illumination output signal 120 for each calibration subset of reflective elements that is activated during the step 902. In embodiments, the control system 202 may perform operations on the calibration signals (e.g., based on the calibration factors described with respect to FIG. 8) to estimate the spectral power distribution of the output of the illumination optical system 100 for each calibration subset. In embodiments, the control system 202 calculates a central wavelength of the spectral power distribution of each output.

In a step 906, the control system 202 generates a calibration model for the illumination optical system 100 based on the calibration responses measured during the step 904. In embodiments, based on the central wavelengths of the outputs of the illumination optical system 100 measured for each calibration subset, the control system 202 may utilize numerical interpolation or curve fitting techniques to generate a calibration model that predicts a spectral power distribution of the illumination optical system as a function of activated subset of reflective elements of the DMD 112. The nature of the calibration model may vary depending on the calibration index used to determine the arrangement of the calibration subsets used during the steps 902 and 904. For example, FIG. 9C depicts an example calibration function 914 estimating an output wavelength (e.g., central wavelength) as a function of pixel column (e.g., extending in the Y-direction of FIG. 9B). The calibration function 914 was generated using $4^{th}$ order polynomial fitting, though it should be understood that various statistical data analysis techniques (e.g., a best-fit solver) may be used to form various alternative types of calibration functions based on similar data. Such a one-dimensional calibration function 914 may be generated using the calibration index described with respect to FIG. 9B (e.g., sequentially activing columns of the DMD 112 as calibration subsets).

The calibration function 914 predicts an output wavelength (e.g., a central wavelength of a spectral power distribution of the illumination output signal 120 if an entirety of columns of the plurality of reflective elements 908 are activated). In embodiments, the control system 202 estimates a spectral power distribution based on the predicted output wavelengths of the calibration function 914 to generate a calibration model. For example, in embodiments, activating an entire column of the plurality of reflective elements 908 may be predicted to have a Gaussian spectral power distribution having a similar peak spectral power for each column. FIG. 9D depicts an example calibration model 916 including spectral power distribution 918 for each column of the plurality of reflective elements 908 (e.g., an estimated spectral power distribution 918 of the illumination output signal 120 if only single column of the DMD 112 was activated). As described herein the spectral power distributions 918 associated with each column may be used to tune the illumination output signal 120 to have a desired spectral power distribution.

Figure 9F:
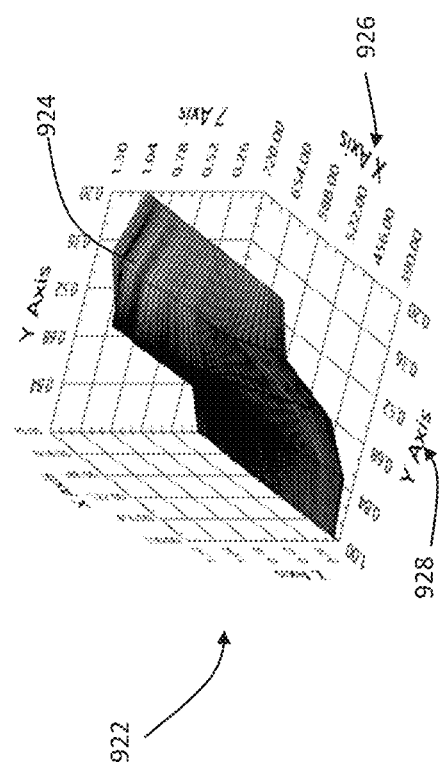
FIG. 9F depicts a calibration curve generated during the method depicted in FIG. 9A using the calibration subset depicted in FIG. 9E, according to one or more embodiments described herein.

FIG. 9F depicts another calibration function 922. The calibration function 922 may be generated in accordance with the calibration index described with respect to FIG. 9E (e.g., using rectangular sub-arrays for the calibration subsets). As depicted, the calibration function 922 includes a two-dimensional surface 924 predicting a DMD wavelength as a function of both a wavelength axis 926 (e.g., extending in the X-direction depicted in FIG. 9E) and an amplitude axis 928 (e.g., extending in the Y-direction depicted in FIG. 9E). The two-dimensional surface 924 may be formed via data interpolation of the various outputs measured during the step 904 for each calibration subset (or via utilization of a best fit solver). The two-dimensional surface 924 predicts a wavelength (e.g., a central wavelength) of an illumination output for each individual reflective element (or subset of reflective elements, such as a 2×2 array) of the DMD 112. In other words, the two-dimensional surface 924 characterizes the illumination optical system 100 along two axes. In embodiments, the calibration function 922 may be used to generate a calibration model for the illumination optical system 100 by estimating spectral waveforms for each individual reflective element of the DMD 112. For example, in one embodiment, each reflective element of the DMD 112 may be assigned a spectral power distribution similar to the spectral power distribution 918 described herein with respect to FIG. 9D. As described herein, the calibration model generated from the calibration function 922 may facilitate more advanced control and tuning techniques such as the utilization of global optimization solving to precisely tune the DMD 112 in order to produce an illumination output signal 120 having a desired spectral power distribution.

Figure 10A:
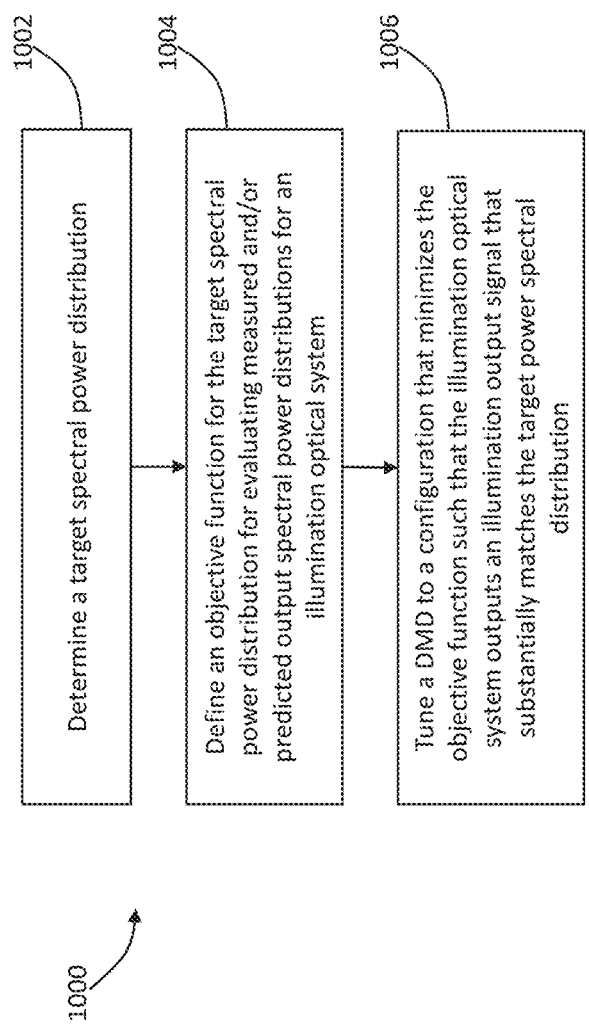
FIG. 10A depicts a flow diagram of a method of tuning a digital micro-mirror device to a configuration to produce an illumination output signal that substantially matches a target power spectral distribution, according to one or more embodiments described herein.

FIG. 10A depicts a flow diagram of a method 1000 of tuning a digital micro-mirror device to a configuration to produce an illumination output signal that substantially matches a target power spectral distribution. For example, the method 1000 may be performed via the illumination system 200 described herein with respect to FIG. 2A to generate an illumination output signal 120 having a spectral power distribution that corresponds to an input provided by a user (e.g., via the graphical user interface 300). In embodiments, the method 1000 may be performed after the illumination system 200 is calibrated via the methods described herein with respect to FIGS. 9A-9F.

In a step 1002, a target spectral power distribution is determined (e.g., via the control system 202). For example, in embodiments, a user may upload a target spectral power distribution to the control system 202. In embodiments, a target spectral power distribution may be created by a software application or the like implemented via the external computing system 216. The target spectral power distribution may include a curve defining a desired spectral power throughout a wavelength range of interest. In embodiments, the user may select from a plurality of target spectral power distributions stored in the control system 202 (or external computing system 216).

In a step 1004, an objective function for the target spectral power distribution is defined. As described herein with respect to FIGS. 10B and 10C, the objective function is used to evaluate measured and/or predicted spectral power distributions of the illumination output signal 120 for various configurations of the DMD 112 (e.g., an activated subset of reflective elements) to determine a configuration of the DMD 112 that provides accurate matching to the target power spectral distribution determined during the step 1002. In other words, the objective function is the standard that is used to determine that the illumination output signal 120 matches the target spectral power distribution. The objective function used may vary depending on the implementation. For example, in embodiments, the objective function may be an area matching function that compares an area under the spectral power distribution of the illumination output signal 120 to an area under the target spectral power distribution. Such an area matching objective function may be computed as $$A = \frac{\sum_{i=1}^{n} |\text{Actual Power}(\lambda_i) - \text{Target Power}(\lambda_i)|}{\sum_{i=1}^{n} |\text{Target Power}(\lambda_i)|} \quad (1)$$

where $\lambda_1, \ldots, \lambda_n$ represents a plurality of wavelengths (e.g., at equal intervals) throughout the wavelength range of interest. In embodiments, the objective function may define a threshold for the value A, indicating a minimum integrated area difference between the actual spectral power distribution of the illumination output signal 120 and the target power spectral distribution.

In embodiments, the objective function may be a root mean square (RMS) fitting function (e.g., single or weight contribution RMS fit). For example, the objective function may be computed as $$RMS = \sqrt{\frac{\sum_{i=1}^{n} (\text{Target Power}(\lambda_i) - \text{Actual Power}(\lambda_i))^2}{n}} \quad (2)$$

where $\lambda_1, \ldots, \lambda_n$ represents a plurality of wavelengths (e.g., at equal intervals) throughout the wavelength range of interest. In embodiments, the objective function may define a threshold for the value RMS, indicating a maximum total RMS error between the actual spectral power distribution of the illumination output signal 120 and the target power spectral distribution. Various alternative objective functions may be used consistent with the present disclosure, such as peak matching, in-band energy matching, and the like.

In embodiments, a user of the illumination system 200 may define various aspects of the objective function. For example, via the external computing system 216, the user may select a particular objective function and select thresholds used by the control system 202 to determine whether the illumination output signal matches or substantially matches the target spectral power distribution in order to stop the tuning methods described herein.

In a step 1006, the control system 202 tunes the DMD 112 to a configuration that minimizes the objective function defined during the step 1004. In other words, the control system 202 determines a subset of the array of reflective elements of the DMD 112 to activate in order to minimize the objective function defined during the step 1004. In embodiments, if the target spectral power distribution determined during the step 1002 matches a historical spectral power distribution of the illumination output signal 120 (e.g., output previously by the illumination system 200), the control system 202 may retrieve the DMD settings used by the illumination system 200 previously to obtain that historical spectral power distribution and implement the historical DMD settings. After the historical DMD settings are implemented (e.g., a historical subset of the array of reflective elements is activated), the control system 202 may measure the illumination output signal 120 (e.g., via the external monitoring sensor 204, via the internal monitoring sensor 122, or both) and evaluate the measured illumination output signal 120 in accordance with the objective function defined during the step 1004. If the objective function is satisfied, the method 1000 may end and the illumination system 200 may provide the illumination output signal 120 for the intended use of the user.

In embodiments, if the target spectral power distribution does not match a historical spectral power distribution previously output by the illumination system 200, or if the measured illumination output signal 120 does not match the target spectral power distribution in accordance with the objective function defined during the step 1004, the control system 202 may tune the DMD 112 to adjust the illumination output signal 120 such that the illumination output signal 120 matches the target power spectral distribution in accordance with the objective function. In embodiments, the particular tuning approach utilized by the control system 202 may depend on the calibration model of the illumination optical system 100 available (e.g., which of the calibration subsets described herein with respect to FIGS. 9A-9E herein were used to generate the calibration model).

Figure 10B:
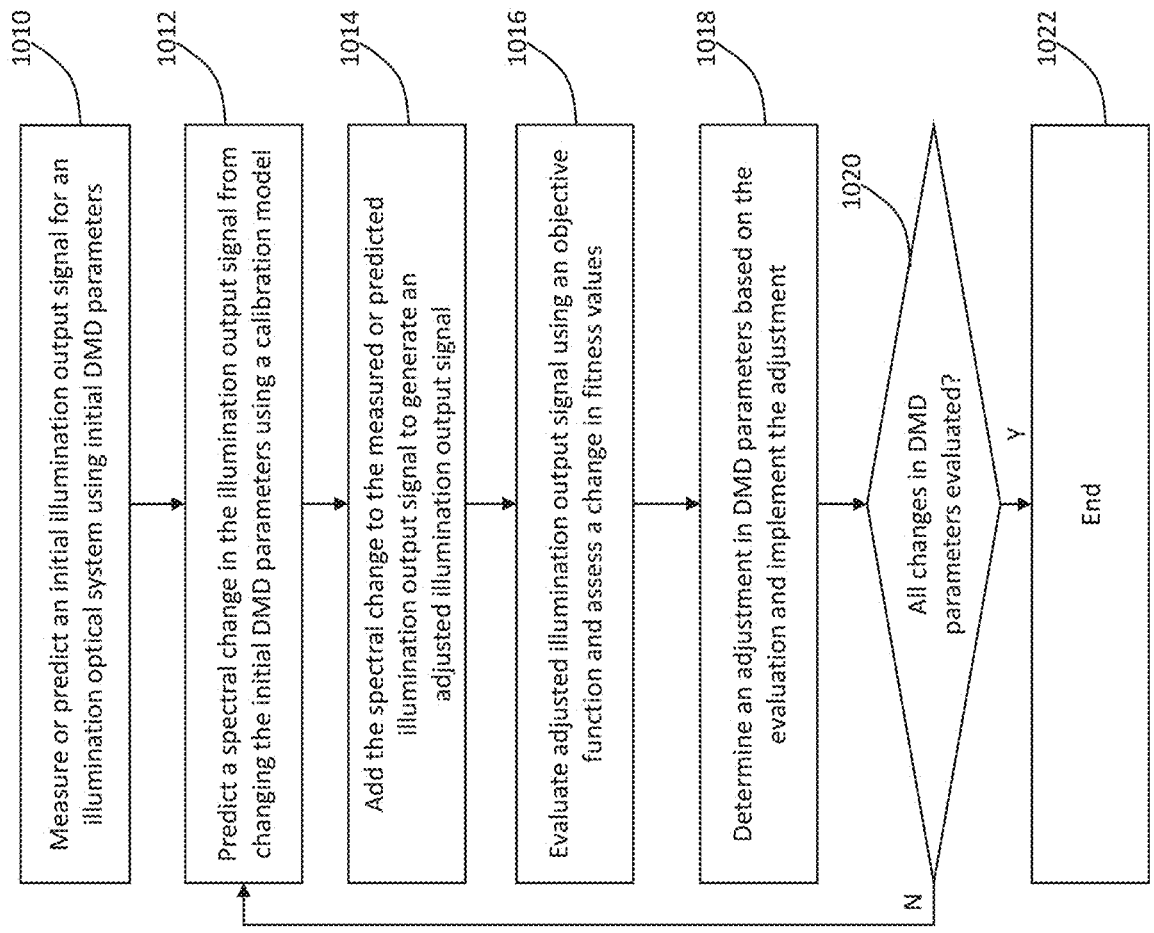
FIG. 10B depicts a flow diagram of a method of determining the configuration of the digital micro-mirror device described with respect to FIG. 10A that produces the illumination output signal, according to one or more embodiments described herein.

Referring now to FIG. 10B, a flow diagram of a method 1008 of determining a configuration of the DMD 112 to produce an illumination output signal 120 that possesses a target spectral power distribution is shown. In embodiments, the control system 202 may perform the method 1008 using a calibration model that predicts a change in the illumination output signal 120 when the configuration of the DMD 112 is altered. Such a calibration model may correspond to the calibration model 916 described herein with respect to FIG. 9D. The calibration model 916 may predict a spectral change in the illumination output signal 120 that would occur if a single column of the array of reflective elements of the DMD 112 was activated or inactivated. Such embodiments utilizing a calibration model to predict a spectral change of the illumination output signal 120 may be referred to herein as a search tuning method.

In a step 1010, the control system 202 measures or predicts an illumination output signal 120 for the illumination optical system 100 using an initial set of DMD parameters (e.g., using an initial activated subset of the array of reflective elements of the DMD 112). For example, in embodiments, the control system 202 may continuously monitor the illumination output signal 120 using the internal monitoring sensor 122 to measure a spectral power distribution thereof. Embodiments not including the internal monitoring sensor 122 may predict the spectral output based on a calibration model of the illumination optical system 100. Such embodiments not including the internal monitoring sensor 122 may require a more precise calibration model (e.g., a more precise calibration model assigning an output spectral power distribution to a smaller subset of the array of reflective elements of the DMD 112 than the calibration model 916 described herein with respect to FIG. 9D) than embodiments incorporating the internal monitoring sensor 122, in order to predict the illumination output with the requisite precision to perform the method 1008.

In a step 1012, the control system 202 predicts a spectral change in the illumination output measured or predicted at the step 1010 that would result from changing the initial DMD parameters using a calibration model. For example, in embodiments, the control system 202 may utilize the calibration model 916 described herein with respect to FIG. 9D to predict a spectral change that would result from adding or removing a column of reflective elements from the initial DMD parameters. In a step 1014, the control system 202 adds the predicted spectral change to the measured or predicted illumination output to generate an adjusted illumination output. In a step 1016, the control system 202 evaluates the adjusted illumination output using the objective function defined during the step 1004 of the method 1000 described with respect to FIG. 10. The control system 202 may also evaluate the initial illumination output signal 120 measured or predicted during the step 1010 using the objective function. In embodiments, the control system 202 may compare the results of the evaluations of the adjusted illumination output signal and the initial illumination output signal to determine a change in fitness values between the illumination outputs (e.g., determine whether the initial illumination output signal or the adjusted illumination output signal better satisfies the objective function). In embodiments, the change in fitness values may be multiplied by weighting and proportional gain settings of the control system 202 (e.g., set by the user).

In a step 1018, the control system 202 determines an adjustment in DMD parameters based on the evaluation of the change in fitness values and implements the adjustment in DMD parameters by updating the activated subset of reflective elements of the DMD 112. For example, in embodiments, if adding a particular column of reflective elements of the DMD 112 to the activated subset produces a beneficial change in fitness values (e.g., the objective function for the adjusted illumination output is closer to a threshold than the initial illumination output), the control system 202 may activate that column to update the activated subset of reflective elements.

In a step 1020, the control system 202 determines whether an entirety of the DMD 112 has been evaluated. For example, the control system 202 may determine whether spectral changes have been predicted for each possible adjustment to the initial DMD parameters (e.g., spectral changes associated with the addition or removal of each column of reflective elements) that can be predicted in accordance with the calibration model. If spectral changes have not been predicted for each possible adjustment, the control system 202 may revert back to the step 1012 and predict the spectral change in the illumination output associated with adding an additional column to the activated subset of reflective elements and repeat the steps 1014, 1016, and 1018 to either activate or not activate that additional column depending on the fitness values associated with that spectral change. Such a process may be repeated for each potential update to the DMD parameters. Once all possible adjustments to the DMD parameters have been assessed, the control system 202 may end the method 1008 at a step 1022 to generate an illumination output signal 120 that corresponds to the target spectral power distribution determined at the step 1002. In embodiments, the control system 202 may store the final DMD settings in the database 214 (or the database 230 of the external computing system 216) for future retrieval via the control system 202.

Other tuning methods may be used by the illumination system 200. For example, the search tuning method described with respect to FIG. 10B may settle on a local minimum of the objective function as opposed to a global minimum. As such, the method 1008 may not provide an optimal set of DMD parameters for the illumination optical system 100. In embodiments, the control system 202 may utilize a global optimization technique to ensure that the objective function is globally minimized with respect to the space of possible DMD settings so that an illumination output signal 120 as close to the target spectral power distribution as possible is generated. In embodiments, such global optimization techniques are compatible with complete calibration models of the illumination optical system 100 (e.g., a calibration model providing a spectral power contribution for each reflective element of the DMD 112, or a small sub-array of reflective elements of the DMD 112). For example, a calibration model based on the calibration function 922 described herein with respect to FIG. 9F may be used in conjunction with a global optimization technique. In embodiments, the control system 202 may utilize any known global optimization technique to randomly simulate the illumination output signal 120 as a function of DMD configuration based on the calibration model.

Figure 10C:
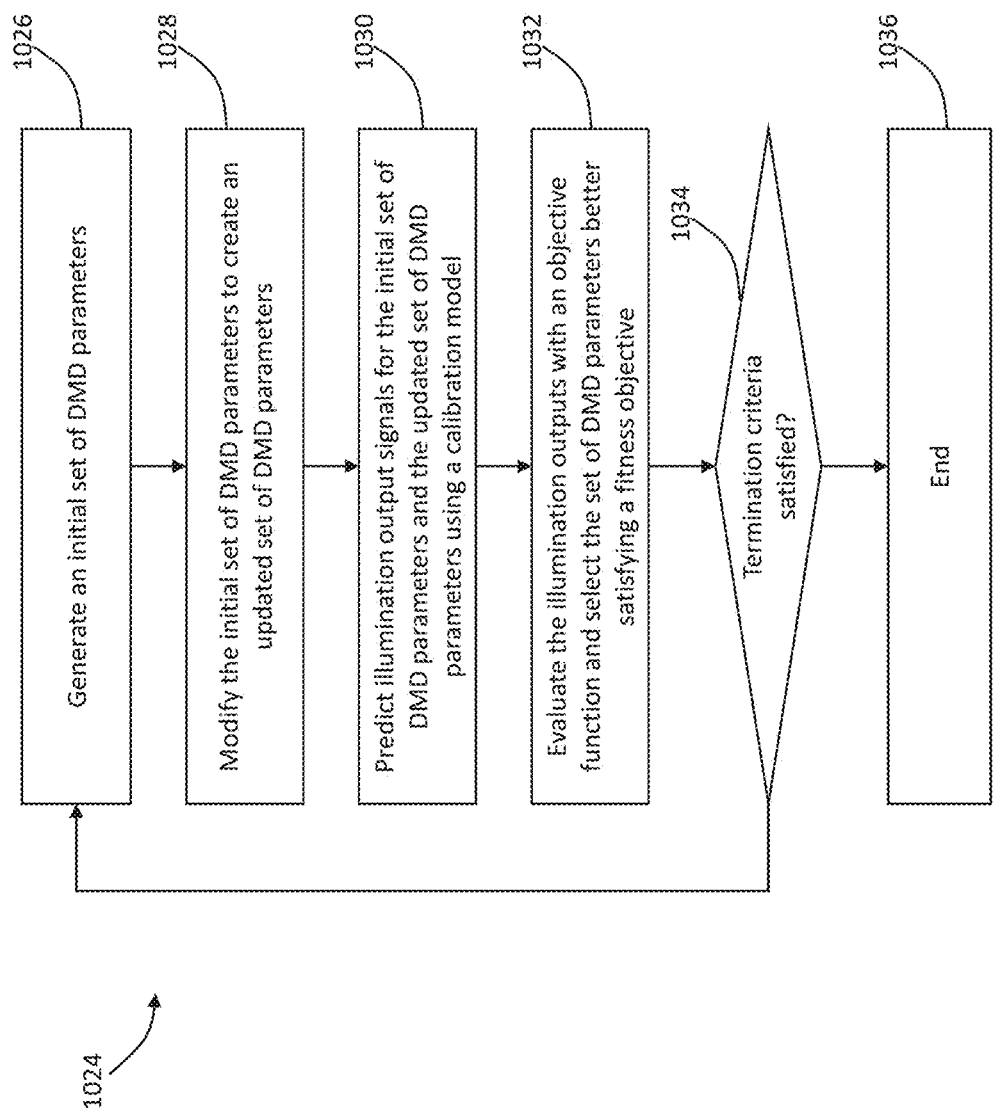
FIG. 10C depicts a flow diagram of another method of determining the configuration of the digital micro-mirror device described with respect to FIG. 10A that produces the illumination output signal, according to one or more embodiments described herein.

Referring now to FIG. 10C, a flow diagram of a method 1024 of determining a set of DMD parameters to ensure that the illumination output signal 120 possesses a target spectral power distribution is depicted. The method 1024 may be used by the control system 202 to generate a plurality of sets of DMD parameters that are input to a calibration model to simulate a plurality of illumination outputs for the illumination optical system 100.

In a step 1026, the control system 202 generates an initial set of DMD parameters. The DMD parameters may define various activated subsets of the reflective elements of the DMD 112. In embodiments, the method 1024 utilizes a differential evolution approach where the initial set of DMD parameters includes a plurality of parameter vectors, which each parameter vector including a random distribution of values for a parameter within a range of values for that parameter between an upper bound and a lower bound. In embodiments, the initial set of DMD parameters may be a stored solution. In a step 1028, the control system 202 modifies the initial set of DMD parameters to create an updated set of DMD parameters. For example, where a differential evolution approach is being used, the control system 202 may mutate the initial set parameters by creating three sub-vectors for each parameter vector, adding a scaled difference between two of the three sub-vectors to a third one of the three sub-vectors to create a donor vector. Random values in each one of the initial parameter vector and the donor vector are then selected to create a trial vector of DMD parameters.

In a step 1030, the control system 202 predicts illumination outputs for the initial set of DMD parameters and the updated set of DMD parameters using a calibration model. In embodiments, the calibration model may predict a spectral contribution for each reflective element of the DMD 112. As such, via the calibration model, the control system 202 predicts a detailed spectral power distribution for each set of DMD parameters. In a step 1032, the control system evaluates the predicted illumination outputs in accordance with the objective function and selects which of the initial DMD parameters or the updated set of DMD parameters better satisfies a fitness objective (e.g., provides an output of the objective function that is closer to a threshold). In a step 1034, the control system 202 determines whether termination criteria are satisfied. The termination criteria may vary depending on the implementation. For example, in embodiments, the termination criteria may define a predetermined number of times that the steps 1026, 1028, 1030, and 1032 must be repeated. If the number of iterations of the method 1024 is less than the predetermined number, the control system 202 may revert back to the step 1026 using the set of DMD parameters better satisfying the fitness objective as the initial set of DMD parameters. In embodiments, the termination criteria are based on a rate of convergence in the fitness objective provided with each iteration of the method 1024. Any termination criteria may be used consistent with the present disclosure. Once the termination criteria are satisfied, the method 1024 ends at a step 1036 and the illumination system 200 is generating an illumination output signal 120 possessing the target spectral power.

In various embodiments, the illumination output signal 120 is subject to various temporal variations. For example, the illumination source 102 may be subject to various temporal fluctuations, which directly influence the illumination output signal 120 because fluctuations in the illumination light 103 directly impact the light directed to the integrating sphere 116 via the DMD 112. In another example, variations in other components of the illumination optical system 100 (e.g., in any of the optical elements disposed therein) or external light sources in an environment of the illumination optical system 100 may cause the illumination output signal 120 to deviate from a target spectral power distribution even if the illumination optical system 100 was previously tuned correctly.

To compensate for such variations in the illumination output signal 120, the control system 202 may utilize real-time stabilization methods. Such real-time stabilization methods provide feedback monitoring of the illumination output signal 120 via a monitoring sensor. In embodiments, real-time stabilization of the illumination output signal 120 may be performed via the external monitoring sensor 204 when the external monitoring sensor 204 is in place. Use of the external monitoring sensor 204 may be beneficial in that it may measure the illumination output signal 120 across a wide range of spectral bands to accurately measure errors between the illumination output signal 120 and the target spectral power distribution. In embodiments, once an error is detected between the illumination output signal 120, the control system 202 may utilize a tuning method escribed herein (e.g., the methods described herein with respect to FIGS. 10A and 10B) to determine an adjustment in DMD parameters and implement the adjustment to reduce the error such that the illumination output satisfies an objective function when compared with a target spectral power distribution.

Referring now to FIG. 11 a flow diagram of a method 1100 for correcting an error of an illumination output is shown, according to an example embodiment. For example, the control system 202 may perform the method 1100 to correct for temporal fluctuations in the illumination output signal 120 caused by, for example, spectral power variations in the illumination source 102. In a step 1102, the control system 202 measures a monitoring signal generated based on the illumination output signal 120. For example, the illumination optical system 100 may be configured with a particular DMD configuration (e.g., a particular subset of the reflective elements of the DMD 112 may be activated) to produce an illumination output signal 120 having a particular target spectral power distribution. The control system 202 may periodically measure a monitoring signal based on the illumination output signal 120 via the internal monitoring sensor 122 or the external monitoring sensor 204 described herein.

In a step 1104, the control system 202 determines an error in the illumination output signal 120 by comparing the illumination output signal 120 to a historical monitoring signal. In embodiments, the historical monitoring signal may be a monitoring signal measured by the internal monitoring sensor 122 during the tuning of the illumination optical system 100 (e.g., via the performance of the methods described herein with respect to FIGS. 10A, 10B, and 10C). For example, the control system 202 may compare a monitoring signal measured by the internal monitoring sensor 122 that was stored just after performance of the method 1008 described herein with respect to FIG. 10B, or performance of the method 1024 described herein with respect to FIG. 10C, to determine an error.

It should be understood that that the internal monitoring sensor 122 may possess any number of sensor channels. In embodiments, the internal monitoring sensor 122 may include a plurality of photodiodes, with each of the photodiodes being paired with a respective band-pass filter covering a different spectral band. In embodiments, the internal monitoring sensor 122 may include a single photodiode measuring a single sensor channel. In embodiments, spectral power measurements performed via the internal monitoring sensor 122 may represent an observed spectral power within only a portion of the range of wavelengths included in the target spectral power distribution for the illumination output signal 120. In embodiments, the particular portion of the range of wavelengths that the measured error pertains to may be scaled by global or individual proportional gain settings utilized by the control system 202.

In a step 1106, the error measured during the step 1104 is expanded across a spectral range. For example, in embodiments where the internal monitoring sensor 122 includes three sensor channels distributed throughout a potential wavelength range for the illumination optical system 100, the control system 202 may utilize curve fitting or data interpolation techniques to estimate an error curve extending throughout an entirety of the potential wavelength range (e.g., establishing an error for each pixel column of the DMD 112). In embodiments, the error may be expanded based on the calibration transfer factors generated for the internal monitoring sensor 122 described herein with respect to FIG. 8. The expanded error may effectively estimate an entire spectral power distribution for the illumination output signal 120 based on the error measured via the internal monitoring sensor 122.

In a step 1108, the control system 202 modifies DMD parameters based on the expanded error. For example, in embodiments, the expanded error may be used to as the initial illumination output of the step 1010 of the method 1008 described herein with respect to FIG. 10B. The control system 202 may then perform the method 1008 to estimate spectral changes in the illumination output signal that would occur as a result of altering the configuration of the DMD in various ways (e.g., adding or subtracting columns from the activated subset of reflective elements) to determine the necessary modifications to the DMD parameters. In a step 1110, the control system 202 modifies the configuration of the DMD 112 using the modified DMD parameters. The illumination output signal 120 is therefore updated continuously responsive to temporal variations in the illumination optical system 100 not resulting from alteration of DMD configuration by updating the DMD configuration to counteract the temporal fluctuations.

As will be understood from the foregoing description, it should be appreciated that an illumination optical system utilizing a digital micro-mirror device to reflect adjustable portions of a spectral image into an integrating sphere provides for a temporally uniform output illumination signal. Moreover, by utilizing the calibration, control, and tuning methods described herein, users may utilize the illumination optical system to generation an illumination output signal having virtually any spectral power distribution that is desired. By adding illumination sources and/or additional digital micro-mirror devices to the illumination optical system, the illumination output signal can be tuned over an even wider spectral range and possess fine spectral features (e.g., peaks). Alternatively or additionally, utilizing a tunable baseline illumination source in conjunction with a digital micro-mirror device facilitates generating illumination output signals possessing a substantially greater dynamic range in terms of spectral power than existing illumination sources. The illumination optical systems described herein have application in a wide variety of fields including, but not limited to, sensor calibration, camera calibration, colorimeter calibration, and material and chemical analysis and identification.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. An illumination system comprising:
   an illumination source configured to emit illumination light;
   a dispersive optical element configured to generate an angularly dispersed optical signal from the illumination light;
   a focusing optics system configured to generate a spectral image from the angularly dispersed optical signal;
   a digital micro-mirror device (DMD) comprising an array of reflective elements, the DMD configured to receive the spectral image and direct a portion of the spectral image as an illumination optical signal;
   a collection optics system configured to direct the illumination optical signal to an entrance port of an integrating sphere; and
   a controller communicably coupled to the DMD, wherein the controller is configured to:
      calculate a subset of the array of reflective elements to activate based on a target illumination output signal using a calibration model of the illumination system; and
      activate the subset of the array of reflective elements to change the portion of the spectral image directed to the entrance port to generate an illumination output signal that substantially matches the target illumination output signal.

2. The illumination system of claim 1, wherein the illumination source, the dispersive optical element, the DMD, and the collection optics are a first light source configured to provide a first illumination optical signal to a first entrance port of the integrating sphere, the apparatus further comprising a second light source configured to provide a second illumination optical signal to the integrating sphere such that the illumination output signal is a combination of the first and second illumination optical signals.

3. The illumination system of claim 2, wherein the second light source comprises one or more light emitting diodes configured to provide light to a second entrance port of the integrating sphere as the second illumination optical signal.

4. The illumination system of claim 3, wherein one or more of the light emitting diodes of the second light source is an adjustable white light LED.

5. The illumination system of claim 2, wherein the second light source comprises:
 a second dispersive optical element configured to generate a second angularly dispersed optical signal from illumination light;
 a second focusing optics system configured to generate a second spectral image from the second angularly dispersed optical signal;
 a second digital micro-mirror device (DMD) comprising an array of reflective elements, the second DMD configured to receive the second spectral image and direct a portion of the second spectral image as the second illumination optical signal;
 a second collection optics system configured to direct the second illumination optical signal to a second entrance port of an integrating sphere.

6. The illumination system of claim 5, wherein the first light source and the second light source both use the same illumination source such that the first and second dispersive optical elements are configured to generate the first and second angularly dispersed optical signals from the illumination light from the illumination source.

7. The illumination system of claim 6, further comprising a beam splitting optical system disposed between the illumination source and the first and second light sources, wherein the beam splitting optical system is configured to direct a first portion of the illumination light to the first light source and a second portion of the illumination light to the second light source, wherein the first and second illumination systems operate in overlapping spectral ranges.

8. The illumination system of claim 5, wherein the first illumination system is illuminated by the illumination source, the illumination system further comprising a second illumination source configured to illuminate the second dispersive optical element to generate the second angularly dispersed optical signal.

9. The illumination system of claim 8, wherein the illumination source is configurable to emit illumination light within a first spectral range and the second illumination source is configurable to emit illumination light within a second spectral range that is different from the first spectral range.

10. The illumination system of claim 1, further comprising an internal monitoring sensor disposed on an interior of the integrating sphere, wherein the internal monitoring sensor is communicably coupled to the controller, wherein the internal monitoring sensor is configured to generate an internal monitoring signal from the portion of the spectral image directed to the entrance port of the integrating sphere.

11. The illumination system of claim 10, wherein the controller is configured automatically adjust the DMD in real-time responsive to changes in the internal monitoring signal to generate a temporally stable illumination output signal.

12. A method of generating an illumination output signal using an illumination optical system, the method comprising:
 illuminating a dispersive optical element with illumination light from an illumination source to generate an angularly dispersed optical signal from the illumination light;
 generating a spectral image from the angularly dispersed optical signal using a focusing optical system;
 determining a configuration for a digital micro-mirror device (DMD) based on a desired spectral power distribution for an illumination output signal, wherein the configuration for the DMD comprises an activated subset of an array of reflective elements of the DMD; and
 directing a portion of the spectral image into an entrance port of an integrating optical sphere using the activated subset of the reflective elements of the DMD to generate the illumination output signal.

13. The method of claim 12, wherein determining the configuration for the DMD based on the desired spectral power distribution comprises:
 directing different portions of the spectral image into the entrance port of the integrating optical sphere using different calibration subsets of the reflective elements according to a calibration index; and
 measuring spectral characteristics of the illumination output signal resulting from the different calibration subsets of the reflective elements; and
 generating a calibration model of the illumination optical system using the measured spectral characteristics of the illumination output signal, the calibration model including a plurality of estimated spectral power distributions associated with various activated subsets of the DMD.

14. The method of claim 13, wherein each of the different calibration subsets comprises a different column of reflective elements of the DMD.

15. The method of 14, wherein the determining the configuration for the DMD comprises:
 measuring or predicting a first illumination output signal using a first activated subset of reflective elements of the DMD using a spectrometer;
 predicting a plurality of spectral contributions of a plurality of changes in the first activated subset based on the calibration model; and
 determining a subset of the plurality of spectral contributions that, when added to the first illumination output signal, results in the desired spectral power distribution; and
 updating the first activated subset of reflective elements to incorporate the changes in the first activated subset associated with the subset of the plurality of spectral contributions.

16. The method of claim 15, wherein each of the plurality of changes in the first activated subset comprises the addition of a column of the array of reflective elements.

17. The method of claim 13, wherein the determining the configuration for the DMD comprises:
 generating a plurality of candidate activated subsets of the DMD;
 using the calibration model, generating a predicted illumination output signal for each one of the candidate activated subsets; and determining that one of the predicted illumination output signals meets a fitness objective with respect to the desired spectral power distribution.

18. A method of generating an illumination output signal of an illumination system, the method comprising:
illuminating a dispersive optical element with illumination light from an illumination source to generate an angularly dispersed optical signal from the illumination light;
generating a spectral image from the angularly dispersed optical signal using a focusing optical system;
directing a portion of the spectral image into an entrance port of an integrating sphere using an activated subset of the reflective elements of the DMD to generate an illumination output signal;
measuring the illumination output signal with a monitoring sensor to generate a measurement signal;
comparing the measurement signal to a historical measurement signal for the activated subset of reflective elements of the DMD; and
updating the activated subset of the reflective elements of the DMD based on the comparison.

19. The method of claim 18, wherein the monitoring sensor is an internal monitoring sensor disposed on an internal surface of the integrating sphere.

20. The method of claim 19, further comprising calibrating the internal monitoring sensor, wherein calibrating the internal monitoring sensor comprises:
illuminating the internal surface of the integrating sphere with a calibration light source;
measuring a calibration response of the internal monitoring sensor;
measuring a calibration output signal of the integrating optical sphere with an calibration sensor disposed externally to the integrating sphere; and
generating a calibration factor for the internal monitoring sensor based on a difference between the calibration response and the calibration output signal.

* * * * *